United States Patent [19]
Nitzberg

[11] Patent Number: 4,566,707
[45] Date of Patent: Jan. 28, 1986

[54] WHEEL CHAIR

[76] Inventor: Leonard R. Nitzberg, 1413 Buckeye La., Knoxville, Tenn. 37919

[21] Appl. No.: 582,066

[22] Filed: Feb. 21, 1984

Related U.S. Application Data

[63] Continuation-in-part of Ser. No. 318,631, Nov. 5, 1981, Pat. No. 4,432,425.

[51] Int. Cl.[4] .............................................. B62D 57/02
[52] U.S. Cl. ...................................... 180/8.2; 180/8.7; 180/907; 280/5.22; 280/6.1; 280/242 WC; 280/DIG. 10
[58] Field of Search ............ 180/8.1, 8.2, 8.7, DIG. 3; 280/5.2, 5.22, 6.1, 242 WC, DIG. 10

[56] References Cited

U.S. PATENT DOCUMENTS

| | | | |
|---|---|---|---|
| 3,104,112 | 9/1963 | Crail | 280/5.2 |
| 3,169,596 | 2/1965 | Wright | 280/5.2 |
| 3,179,431 | 4/1965 | Pikl | 280/5.2 |
| 3,196,970 | 7/1965 | Brenner | 280/DIG. 10 |
| 3,226,128 | 12/1965 | Grier, Jr. | 280/5.2 |
| 3,304,094 | 2/1967 | Wenger | 280/5.2 |
| 3,529,688 | 9/1970 | Bruce | 280/5.22 |
| 3,869,011 | 3/1975 | Jensen | 280/5.22 |

FOREIGN PATENT DOCUMENTS

| | | | |
|---|---|---|---|
| 72081 | 2/1976 | Australia | 180/8.2 |
| 191673 | 11/1983 | Japan | 280/5.22 |

*Primary Examiner*—Joseph F. Peters, Jr.
*Assistant Examiner*—Kenneth R. Rice
*Attorney, Agent, or Firm*—Pitts and Brittian

[57] ABSTRACT

A mechanism for the transport of an object across relatively level surfaces as well as to ascend and descend stairways. The mechanism is described particularly with respect to a wheel chair for handicapped persons and is provided with a frame and a pair of support wheels on each side of the frame. A climbing chain with lugs is associated with each wheel on the frame; these chains being inclined at an angle providing a desired lifting height. The wheel chair is either powered by the occupant or by electrical or other corresponding power means. Appropriate sensing means on the frame ascertain a nonlevel condition in pitch or yaw during ascent or descent of the stairs whereby corrections are made in the driving means such that a level orientation is reestablished. Braking is provided by appropriate gearing whereby an interruption of the driving power holds the climbing chains in their current position. In one embodiment, the mechanism is provided with means for selectively varying the relative rotational speed of the various climbing chains to facilitate the substantially simultaneous loading of each climbing chain. Specific embodiments of drive trains and climbing chains are described.

17 Claims, 51 Drawing Figures

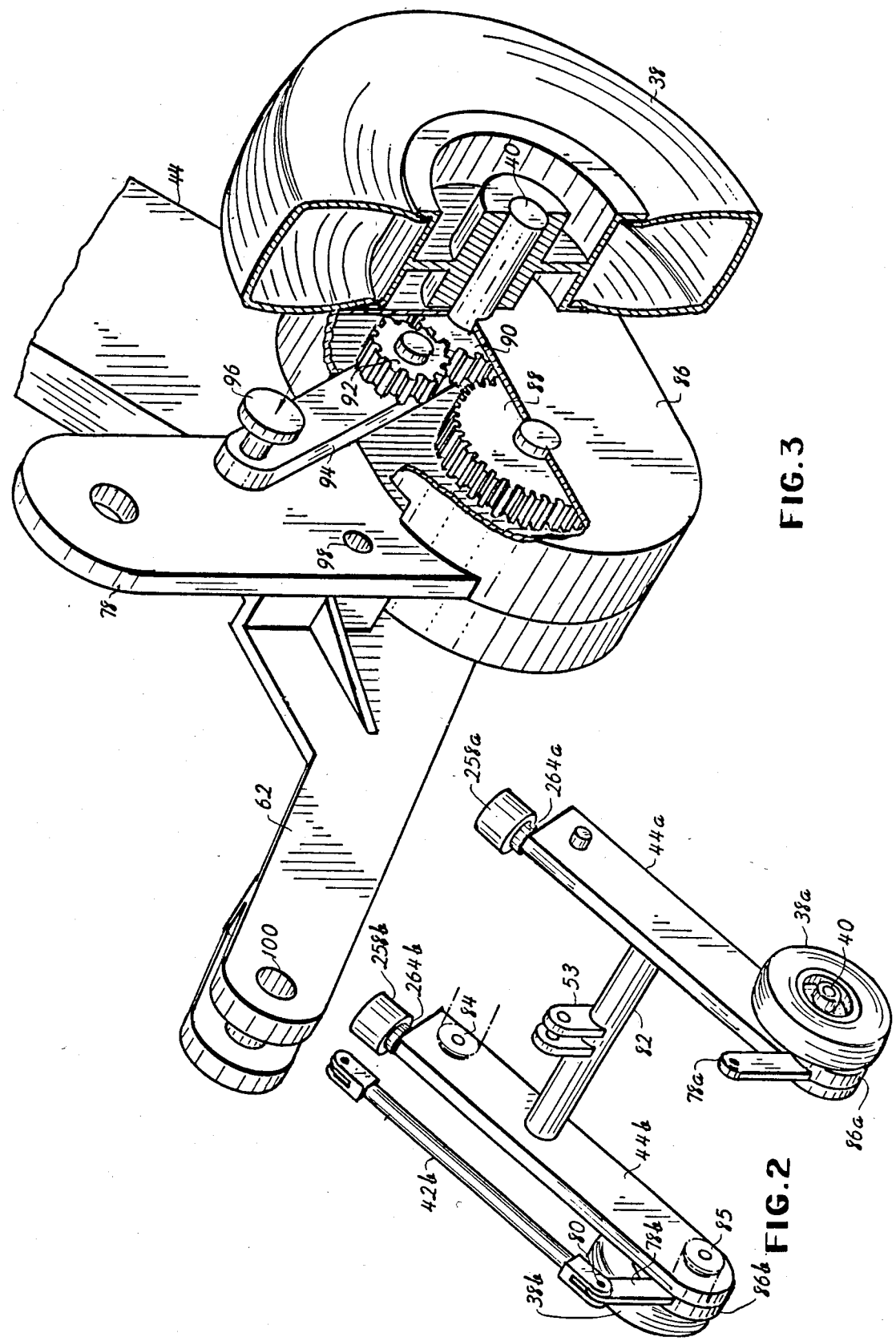

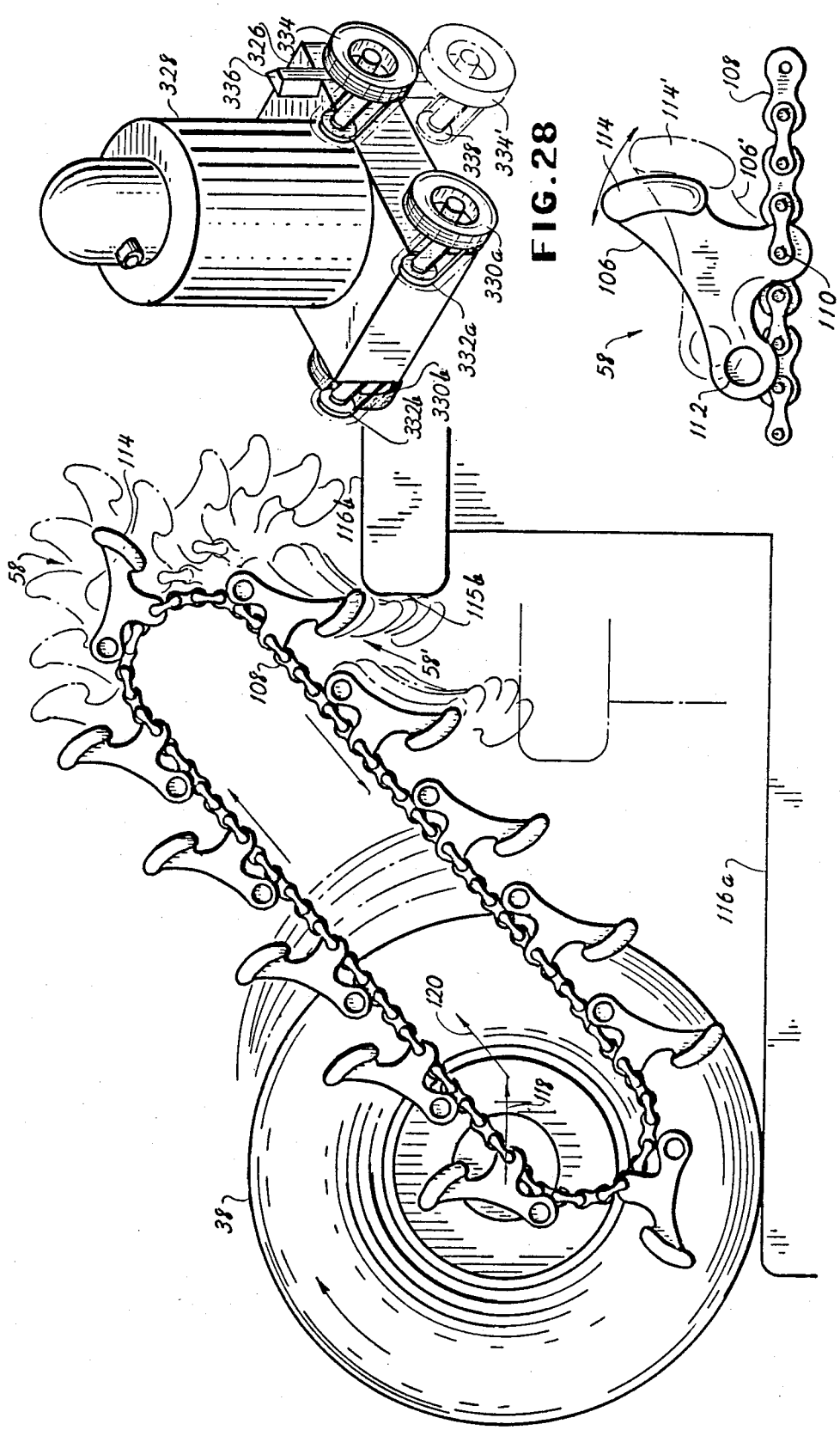

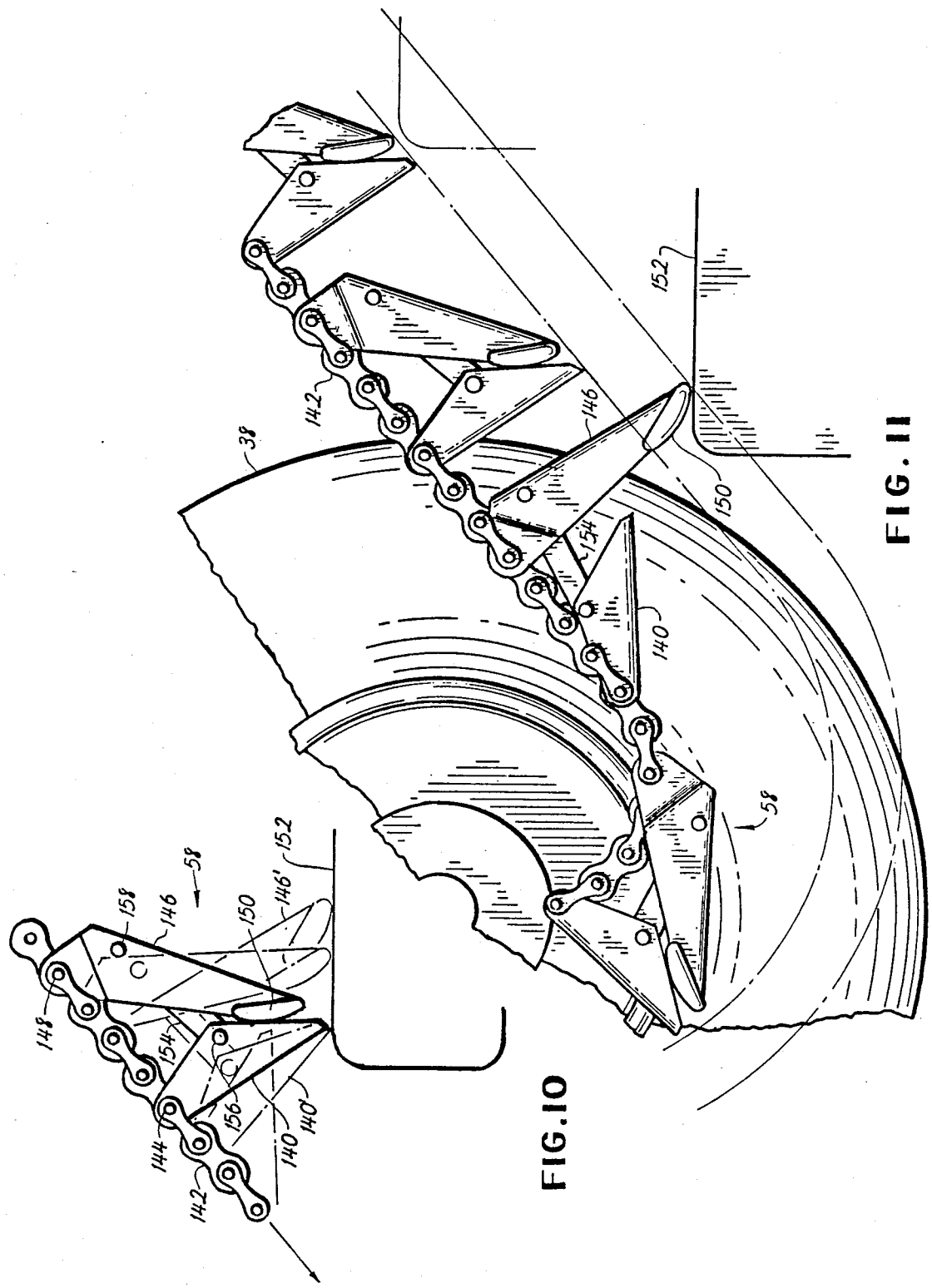

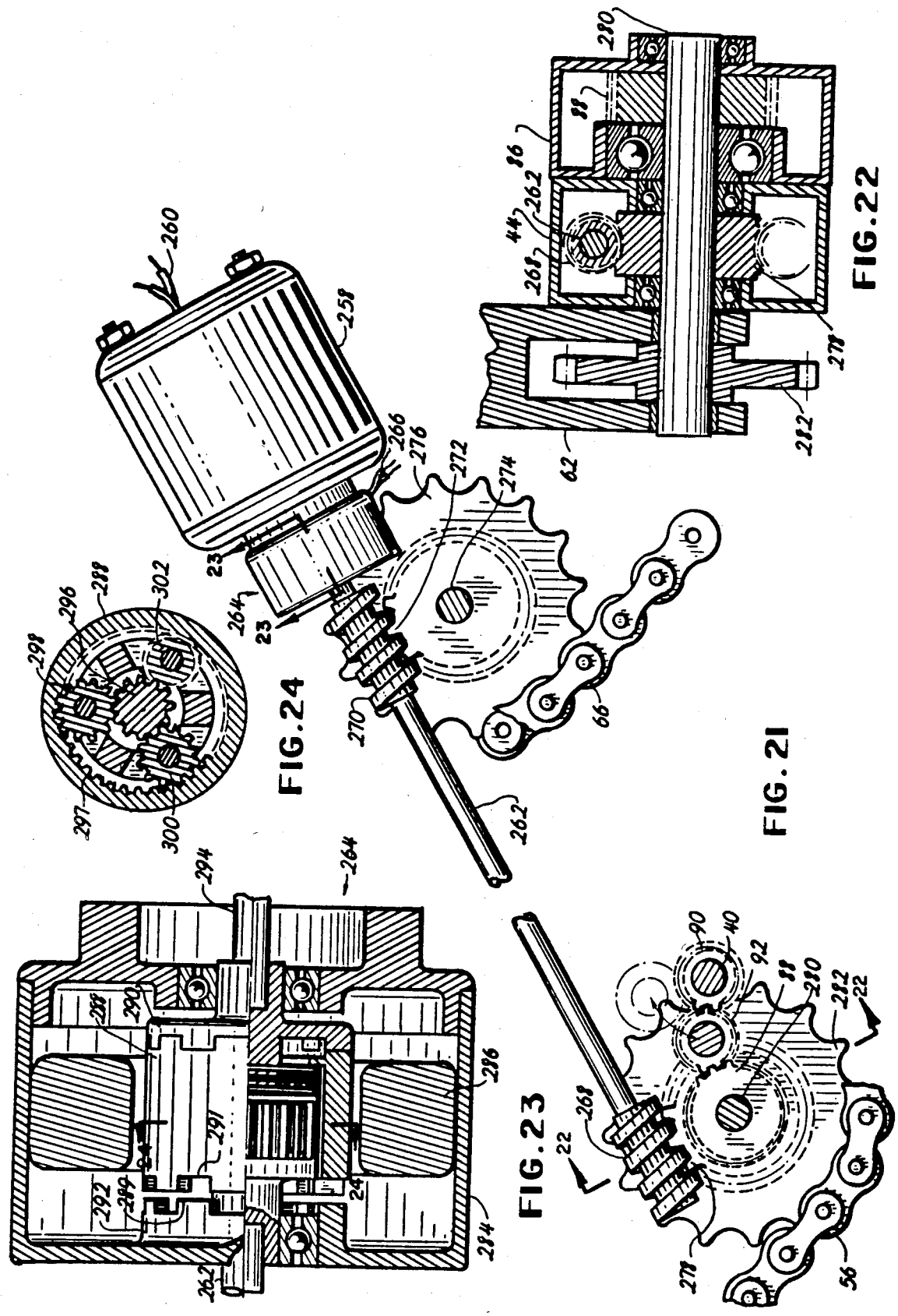

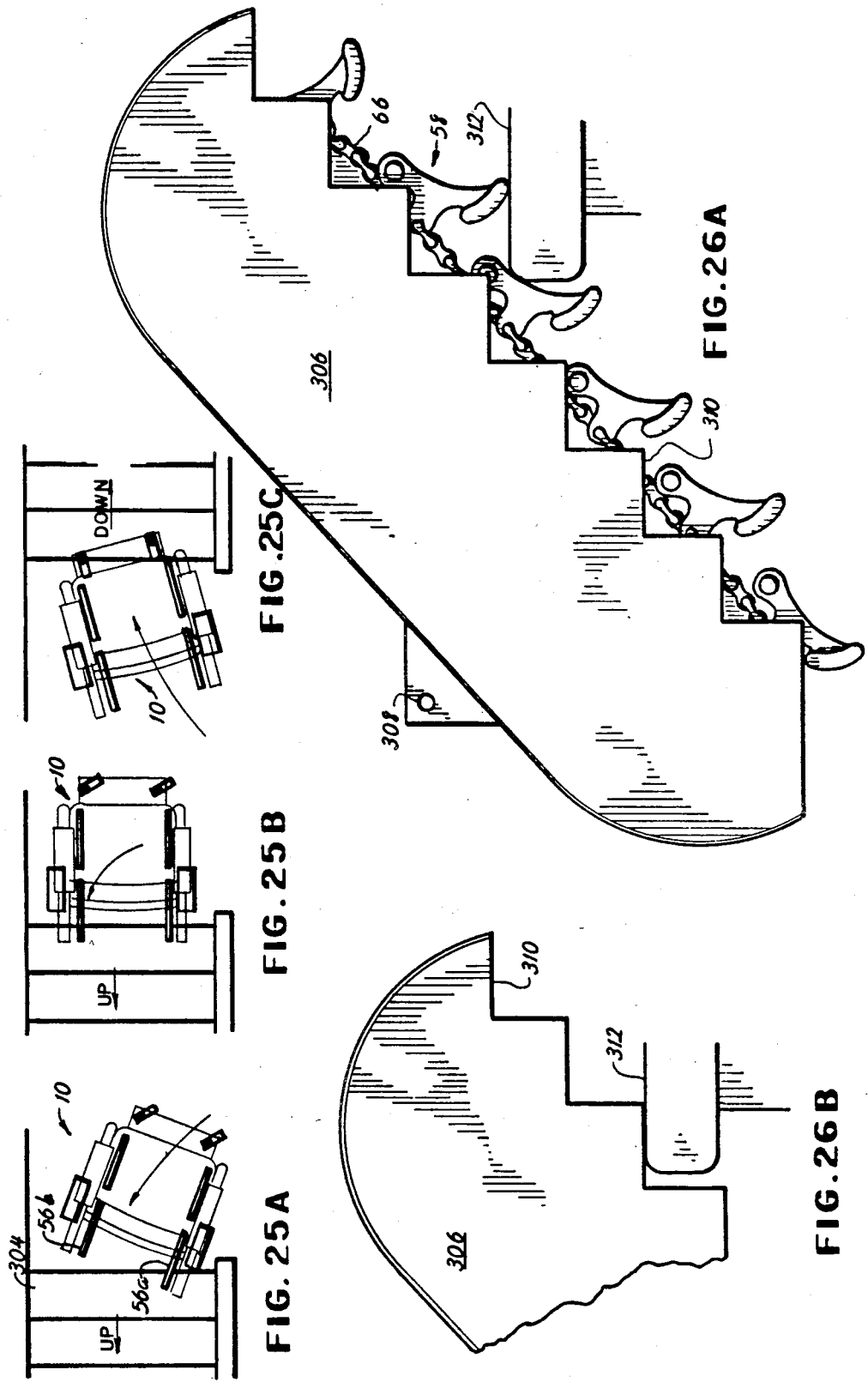

FIG. 32 A
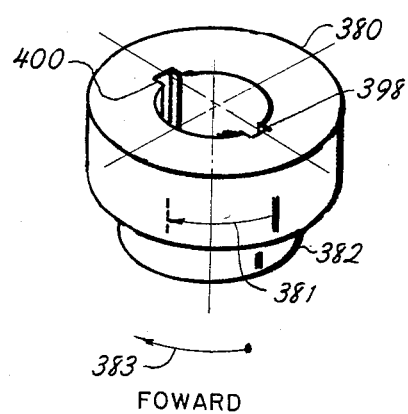
FOWARD
FIG. 32 B
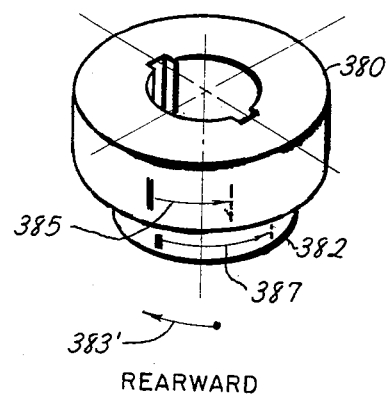
REARWARD
FIG. 33
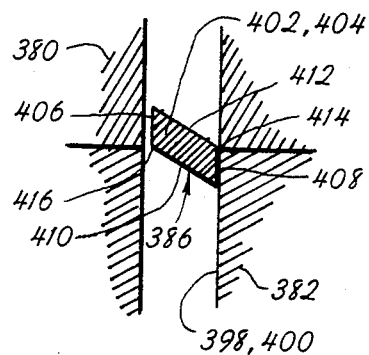
FIG. 34 A    FIG. 34 B
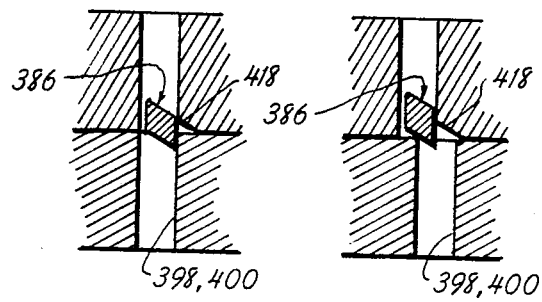
FIG. 34 C    FIG. 34 D
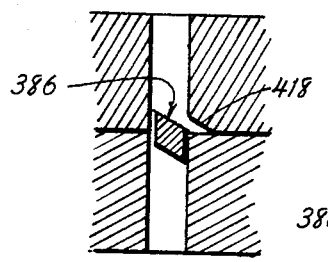
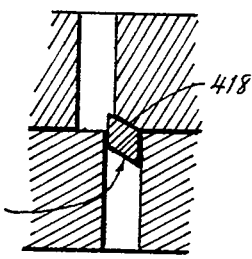

WHEEL CHAIR

This invention is a continuation-in-part of U.S. patent application, Ser. No. 318,631, filed Nov. 5, 1981, and now U.S. Pat. No. 4,432,425 issued Feb. 21, 1984.

TECHNICAL FIELD

The present invention relates generally to apparatus for moving objects up and down stairs, as well as on substantially level terrain, while maintaining the objects in a stable orientation, and more particularly to wheeled chairs suitable for conveying handicapped individuals under these conditions. The apparatus may be motor driven or, in the case of the wheeled chair, may be either hand powered by the occupant or motor driven.

BACKGROUND ART

A severality of stair-climbing wheel chairs have been described and detailed in the art. For example in U.S. Pat. No. 3,104,112, issued Sept. 17, 1963, to J. W. Crail, a device is disclosed in which an occupant-propelled folding wheel chair is provided with a folding frame upon which is mounted a pair of front casters and a pair of rear main wheels sufficiently large in diameter to roll over normal stair steps. The chair is adapted for occupant propulsion by hand-operated means for driving said main wheels.

A stair climbing mechanism is provided which includes a pair of arms, one carried on each of the side frames. The arms are pivoted at the rearward end coaxially with one of the main wheels. This permits the forward end of the side arm to swing between a raised and lowered position. Further, a pair of stair climbing wheels, one mounted forward of each of the arms, is provided which has a diameter smaller than the main wheel but large enough to roll over normal stair steps. Additionally, a transverse brace member is disposed between the arms sufficiently forward to clear the side frames of the chair during the swinging movement of the arms. In addition, a linkage means on each of the side frames is pivotally mounted on the side frames. The linkage means are adapted to be manually operated by an occupant of the wheel chair to move the arms from a raised to a lowered position for stair climbing. A ratchet gear integrally rotatable with each of the main wheels, together with retractable pawl means for engaging the ratchet gear during stair climbing, is provided. Also, a releasable latch means for holding the stair-climbing position of the elements is provided.

In U.S. Pat. No. 3,169,596, issued Feb. 16, 1965, to S. A. Wright, a step traversing wheel chair is disclosed comprising the combination of a chase with wheels for traveling over even surfaces. Additionally, one or more rotatable screws transversly spaced and disposed in rearwardly inclined positions and connected to the chase are provided for propelling the same over steps. Means for rotating the screws and means for raising and lowering the wheels whereby the screws may assume a step engaging position when the wheels are retracted are also provided.

In U.S. Pat. No. 3,226,128, issued Dec. 28, 1965, to R. C. Brier, Jr., a wheel chair is described having a frame and seat supported by a pair of spaced wheel assemblies with hubs carried by shafts. Means for ascending and descending a stairway include support means positioned forwardly of the frame which are adjustable to the angle of the stairway to be traversed. Further, a plurality of gripping means are spaced circumferentially about the hub of the wheel chair and extending radially beyond the wheels of the chair while ascending a stairway. The plurality of gripping means rotate rearwardly responsive to an upward and rearward force being applied successively to forwardly extending gripping means by the occupant of the chair. This causes the rearwardly extending gripping means to successively contact the steps and lift the chair up as the occupant pulls upward and rearward. In addition, a locking means is provided which permits the chair to slide down the stairway when a gripping means is released prior to engaging the next gripping means. Additionally, a means for limiting forward movement of the gripping means is required when descending the stairway in predetermined increments of movement.

In U.S. Pat. No. 3,304,094, issued Feb. 14, 1967, to R. B. Wenger, a wheel chair is described comprising a seat frame having depending rear supporting leg means and depending front supporting leg means which support wheels connected to the seat frame at its opposite sides. Respective elliptical wheels slidably and pivotally connected to the opposite sides of the seat frame at the rear portion thereof are arranged in vertical longitudinal planes and means are provided to rotate the elliptical wheels into engagement with a rearwardly adjacent stair step. This causes the elevation of the rear portion of the seat frame. Respective caster assemblies, slidably connected to the front supporting leg means at the opposite side of the seat frame are provided with means to extend the caster assemblies downwardly when needed so that the seat frame may be leveled when the rear portion thereof is raised or lowered.

Many handicapped persons are weak or so infirmed as to lose much of their dexterity and in some instances possess voluntary motor response in only one or two fingers or less. Further, many individuals confined to wheel chairs are extremely susceptible to blows or impact and find it unwise to hazard precarious disorientation or loss of traction of a vehicle proximate a stairway which occurrence could result in an accident. More specifically, the machines of U.S. Pat. Nos. 3,104,112 and 3,226,138 and 3,304,904 are manually propelled and require great strength to operate. Further, the chair of U.S. Pat. No. 3,104,112 is suitable for the ascent of stairs but has no provision for descent, and the machine of U.S. Pat. No. 3,304,094 provides means for ascending or descending stairs with the rearward portion of the chair and leveling the attitude of the chair by extending or retracting the forward wheels, but no provision is made for traversing stairs with the forward portion of the chair. Also, the chairs of U.S. Pat. Nos. 3,104,112 and 3,304,904 depend upon the coefficient of friction of a curved surface located at an angle to the stair during the traversing of such stairs to prevent accidental slippage and possible accident. Still further, the chairs of U.S. Pat. Nos. 3,169,596 and 3,226,128 require great dexterity or balance to commence or conclude the stair traversing mode. Furthermore, the operation of the stair climbing apparatus of U.S. Pat. No. 3,169,596 may cause damage by friction to stair faces and, should the pitch of the stair tread not coincide with the pitch of the screw member, the screw member may be prevented from engaging the stair tread by interference between the periphery of the helical member and the nosing of a stair tread.

Further, wheelchairs which accomplish stair traversal using rotated endless belts or tracks combined with cleats thereon for supportively contacting a stair tread have been described and detailed in the art. For example, the Letters U.S. Pat. No. 3,529,688, issued on Sept. 22, 1970, to John W. Bruce. However, such chairs are often unsafe given that step size of various stairs will undoubtedly vary, and as the belts or tracks traverse from stair tread to stair tread, the selectively spaced cleats may or may not mate with each successive stair tread. Thus, where a cleat does not precisely mate with the next stair tread encountered, the cair must slip downwardly since load is transferred from one cleat to a second cleat. This problem is discussed with regards to stair-climbing wheelchairs in *VAREC REVIEW*, Vol. 1, No. 2, May 1981 (Veterans Administration Rehabilitation Engineering Center, 252 Seventh Avenue, New York, N.Y. 10001).

Accordingly, it is an object of the present invention to provide a wheel chair suitable for rolling or being propelled across flat and inclined surfaces on wheels and suitable also for traversing steps. Another object of the present invention is to provide a wheel chair having means for traversing steps which provides positive traction by firmly gripping the surfaces of the treads. Yet another object of the present invention is to provide a wheel chair having driven lugged chains suitable for contacting a step and propelling a wheel chair traversing said step. Still another object of the present invention is to provide a deployable lug for the driven chain of the chair which increases the grasp of the stair tread during ascent and descent. An additional object of the present invention is to provide a wheel chair for traversing steps with means to automatically maintain the occupant properly balanced in the chair.

Still another object is to provide a wheel chair which is adaptable for movement over substantially level terrain as well as along stairs which may be manually operated safely with a minimum effort by an occupant. A further object is to provide a motor driven wheel chair for use in ascending and descending stairs with means for orienting and then maintaining the wheel chair movement perpendicular to stair treads.

It is a further object of the present invention to provide a wheel chair which is not subject to downward slippage as the chair traverses a stair and load is shifted from one stair tread to another.

Furthermore, it is an object to provide apparatus for moving objects up and down stairways while maintaining the objects in a stable altitude. Other objects and advantages of the invention will become apparent upon reading the detailed description and referring to the drawings.

BRIEF DESCRIPTION OF THE DRAWINGS

FIG. 2 is an isometric view of mechanisms for elevating a rearward pair of wheels of the chair of FIG. 1.

FIG. 3 is an isometric view, partly cut away, showing drive means for the rear wheel of the wheel chair of FIG. 1 together with disengaging means therefor.

FIG. 5 is an elevation of one embodiment of a climbing lug for the climbing chains of the present invention as indicated in FIG. 1.

FIG. 6 is a drawing illustrating operation of the lug and chain of FIG. 5 when ascending stairs having one specific pitch.

FIG. 10 is an elevation of a second embodiment of a climbing lug for the climbing chains of the present invention.

FIG. 11 is an elevation illustrating the operation of the climbing lug and chain of FIG. 10.

FIG. 21 is a drawing illustrating a drive train for a motor operated wheel chair, such as illustrated in FIG. 1.

FIG. 22 is a cross-sectional drawing of the sprocket drive of FIG. 21 taken at 22—22 thereof.

FIGS. 23 and 24 are cross-sectional drawings of a clutch used with the drive train of FIG. 21.

FIGS. 25A to 25C are a series of drawings illustrating the alignment of a wheel chair, such as that of FIG. 1, with stairs when powered with the gear train of FIG. 21.

FIGS. 26A and 26B are elevations of a climbing chain and chain guard showing a safety feature of the present invention.

FIG. 28 is an isometric view of the application of the present invention to an object other than that of a wheel chair.

FIGS. 32A and B are isometric views of a pair of cooperating spur gears of the means for selectively varying the relative rotational speed of the various climbing chains of the present invention.

FIGS. 33 and 34A, B, C and D are cross-sectional drawings of a gear engaging pin and associated gears of said means for varying the relative rotational speed of the various climbing chains of the present invention.

SUMMARY OF THE INVENTION

In accordance with the invention, an apparatus as exemplified by a wheel chair for supporting an occupant nominally in a sitting position is provided. Thus, the chair has a frame with a seat and a back oriented for comfortable positioning of the occupant. The forward end of the seat extends downwardly and terminates in a set of caster wheels. Rearwardly of these caster wheels is a second pair of wheels which are driven by any suitable power source. In an alternate embodiment, the driven wheels are located proximate the forward portion of the device and the caster wheels are located rearward of the driven wheels. The source may be motor or may be a mechanism which the occupant operates. Associated with the driven wheel on each side is a climbing chain set at an angle to the horizontal orientation, the angle being any convenient angle which provides the desired lifting height and maintains the point of contact forward of the center of gravity of the device being lifted. Furthermore, this climbing chain is provided with lugs for the grasping of stair treads. A second pair of climbing chains of a similar construction are oriented near the caster wheels and provided with a point of contact rearward of the center of gravity, thus providing a total of four climbing chains. The rearward driven wheels and the chain-lug components associated therewith are positionable from a plane of the caster wheels to an elevation wherein they may engage stairs which are elevated from the level of the caster wheels. The mechanism for raising the driven wheels provides for the maintenance of the seat of the chair in a substantially level position with the center of gravity of the occupant such that the chair is stable while ascending or descending stairs. Means are provided for altering the relative rotational speed of the various climbing chains such that the climbing chains are maintained in a loaded position while the chair is ascending or descending a stair. Provisions are also made to correct for any misorientation in a forward-to-rearward (i.e. pitch) alignment or a side-to-side (i.e. yaw) alignment of the chair. Other safety features are included to properly protect an occupant from falling, and to assist in ease of manipulating the wheel chair of the invention.

DETAILED DESCRIPTION OF THE PREFERRED EMBODIMENTS

Figure 1:
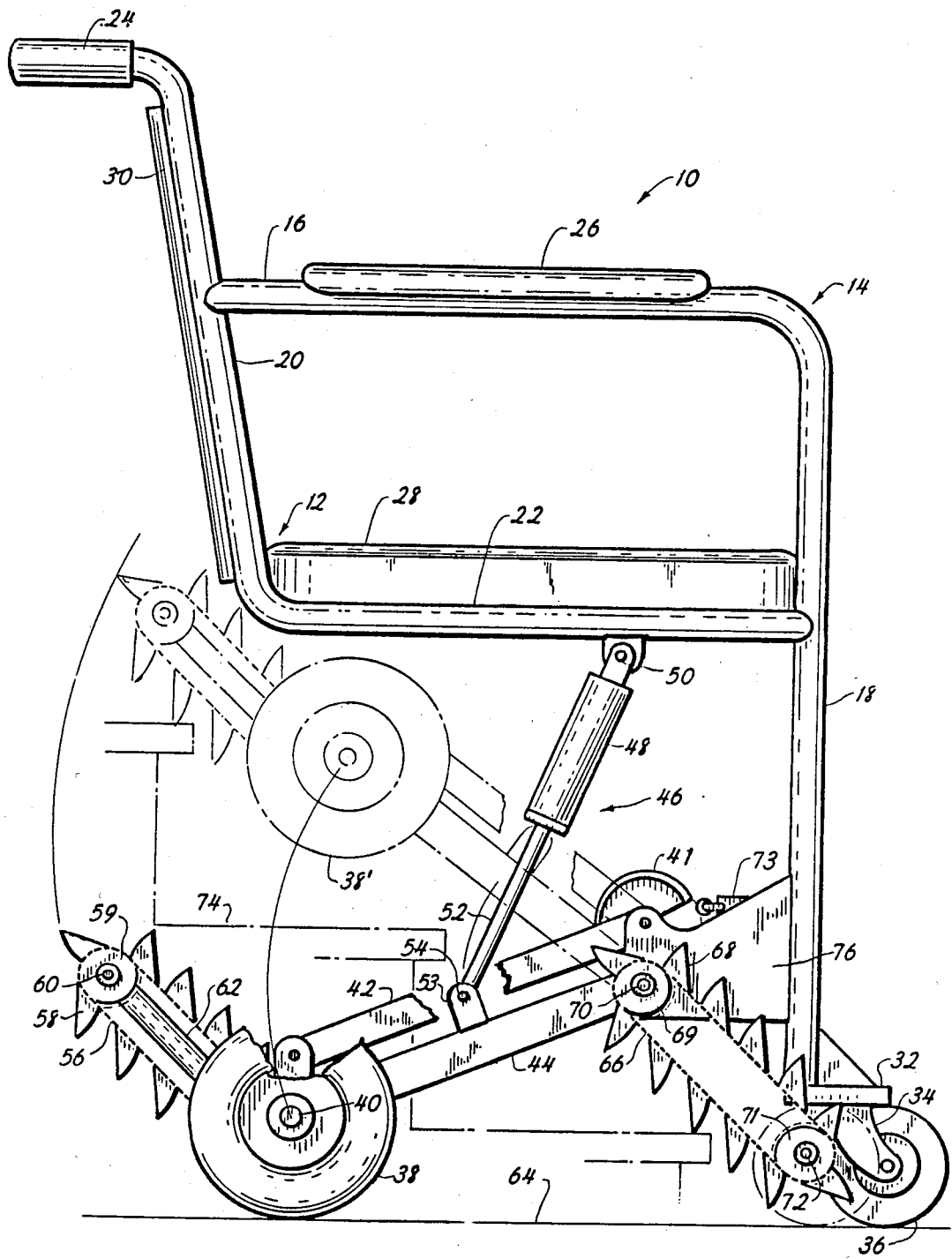
FIG. 1 is a side elevation of one embodiment of a wheel chair according to the present invention.

Referring now to the drawings, a step traversing wheel chair, designed generally at 10 in FIG. 1, is constructed in accordance with the various features of the invention. This chair 10 is suitable for being operated by, and suitably transporting, infirmed or handicapped individuals who may have a limited mobility range and impairments of motor coordination and strength. When properly powered, it is suitable for use by even those individuals whose mobility range is limited to the use of two fingers on one hand or a similarly limited mobility range. The apparatus 10 is adapted to support these individuals and transport them in a rolling manner which is defined herein as moving on wheels across level and inclined ground surfaces such as floors, streets, inclined ramps, sidewalks, hard soil, and the like, either forwardly or backwardly at operator controlled variable speeds. The apparatus 10 is further adapted to support these individuals and transport them traversing steps, which is defined herein as an intermittent movement from one more or less horizontal plane to another similar proximate plane, at operator-controlled variable speeds either ascending or descending these steps.

Referring now to FIG. 1 in more detail, this embodiment of the wheel chair is provided with a frame which is fabricated from a pair of tubular members 12 and 14 on each side of the chair. These tubular members are bent and welded or otherwise joined into the general configuration of the chair which provides an arm rest 16, a forward leg 18, a back rest 20 and a seat support 22. The back rest 20 is further provided with assistance handles 24 on each side of the chair. An arm rest 26 may be attached by any suitable means to the arm support 16, and a seat 28 is attached by any suitable means to the seat support 22. Further, a back cushion or support 30 is attached by any suitable means to the back rest 20. It will be understood that other constructions to form a chair-like member may be provided and flexible back and seat members may be used, particularly for chairs which have provisions for moving one side member toward the other to minimize space. Positioned at the bottom of each forward leg 18 is a platform 32 which, in turn, supports a yoke 34 and a caster wheel 36.

Mounted rearwardly from the caster wheel 36 on each side of the chair 10 is a driving wheel 38 mounted on an axle 40. This axle may be rotated by any combination of drive means which may originate with a motor 41, for example. Electrical power may be supplied from a battery 73. Provision is made for raising the driving wheel 38 to a position such as at 38' for stair movement operation of the chair. This provision includes, for example, a pair of parallel arms 42, 44 and a positioner 46 connected between one of the arms 42, 44 and the frame of the chair. This positioner includes a linear actuator 48 pivotally connected to the chair frame as at 50 and a strut 52 pivotally connected to one of the arms 42, 44 with a pivot 54. Associated with each of the driving wheels 38 is a rotatable chain 56 from which extend lugs 58. The outward end of chain 56 is supported on a sprocket 59 which rotates about an axle or shaft 60. The opposite end of chain 56 is supported on a sprocket (not shown) which is connected through means (not shown) to the means for driving the wheel 38 (see FIG. 16, for example). A support bar 62 maintains the proper length of the chain between sprockets by means described hereinafter. It should be pointed out that the chain can be oriented at any convenient angle which provides the desired lifting height and maintains the point of contact with the stair forward of the center of gravity of the wheel chair.

A second climbing chain 66 is associated with the front portion of the seat adjacent the caster wheel 36. This chain 66 is also provided with lugs 68 and is driven by a sprocket 69 attached to shaft 70. A second sprocket 71 mounted on shaft 72 supports the lower end of this chain. The aforementioned shaft 70 and ends of the parallel arms 42, 44 may be positioned, for example, in a bracket 76 attached to the front legs 18 of the chair. Once again, the climbing chains can be oriented at any convenient angle which provides the desired lifting height and, in the case of the second climbing chain 66, maintains the point of contact with the stair forward of the center of gravity of the wheel chair. Details of the preferred embodiments of the various components are given hereinafter with regard to other of the drawings.

A typical construction for the driving wheels 38 and their support are illustrated in FIGS. 2 and 3. Referring to FIG. 2, for example, this is an isometric view of the support for the pair of driven wheel 38a and 38b. As described above, the orientation of these wheels with respect to a level orientation is provided with a pair of bars such as illustrated at 42b and 44b with only 44a being shown with regard to wheel 38a. The bars 42 are supported at one end at the end of an extension 78a and 78b with a pivot 80. The bars 44a and 44b are separated by rigid connector 82 to which is attached a yoke 53 to which the aforementioned leveling device 46 is attached. The bars 44a and 44b may be, for example, a housing which enclose drive trains (see FIG. 21) which are driven in turn by motors 258a, 258b, and clutches 264a and 264b. The aforementioned climbing chains are connected to sprockets 84 (similar to sprocket 69 of FIG. 1) and 85.

Shown in FIG. 3 are further details of typical driving means for the wheels 38. Within gear case 86 is typically a set of gears such as 88, 90, and 92. Gear 88, for example, is driven by the aforementioned drive train within arm 44, and gear 90 is attached to the aforementioned axle 40 of wheel 38. The third gear 92 is moveable from engagement with the other gears by means of a pivotable lever 94. This lever 94 may be moved to two positions: one as shown, and the other as oriented whereby detent element 96 engages an aperture 98. When the detent 96 is positioned as shown there is no connection between gear 88 and gear 90 and therefore the wheel 38 is not powered and is free to rotate. Shown in this figure also is the arm 62 which maintains the spacing of sprockets used for supporting the climbing chain 56 as shown in FIG. 1. The outer end thereof is provided with apertures 100 to receive the aforementioned axle 60 for the outer sprocket, not shown, upon which the climbing chain 56 is supported.

Figure 4A:
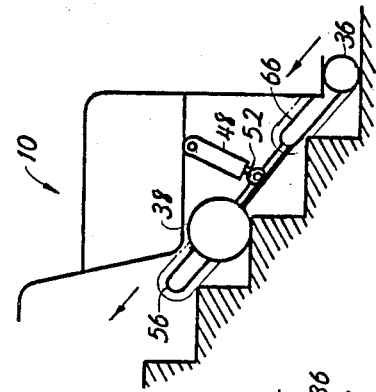
FIGS. 4A to 4H are a series of "stick" drawings illustrating an automatic front-to-back, i.e., pitch leveling feature of the present invention ascending or descending a stairway.
Figure 4B:
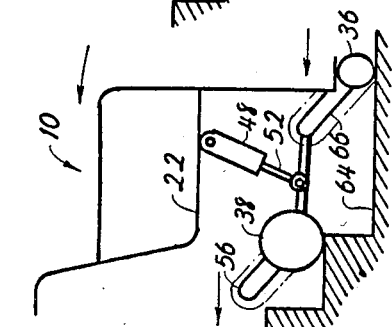
Figures 4C, 4D, 4E:
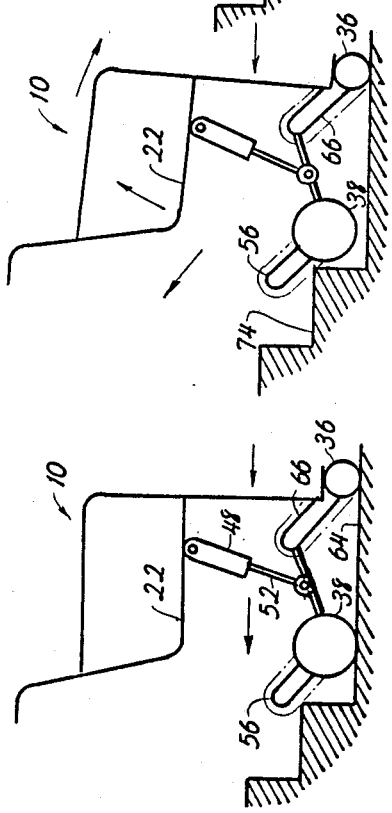

A seat leveling mechanism for pitch control was briefly discussed in connection with FIG. 1. This mechanism involves a linear actuator 48 having an axially extendable strut 52. The device is connected between the frame of the chair and one of a pair of arms 42, 44 whereby the relative position of a plane containing the wheels 36 and 38 can be varied with respect to the level of the chair seat support 22. The operation of this leveling mechanism may be explained by reference to FIG. 4. Shown in FIG. 4A is the case where wheels 36 and 38 are substantially level as upon a level floor 64. In this position, the seat support 22 of the chair 10 is at an orientation to properly support an occupant within the chair. In this position, the wheel chair may be moved forwardly or rearwardly and no operation of the leveling mechanism is involved. However, as shown in FIG. 4B, when the wheel 38 becomes elevated for any reason, as in climbing a stair as shown, the seat support 22 is tilted upwardly at the rear which would cause an occupant to be moved forwardly and perhaps toppled from the chair. To compensate for this tipping (change of pitch) motion, the leveling mechanism retracts by moving the strut 52 into the actuator 48 whereupon the seat support 22 is again at a proper level (FIG. 4C). The sensing for this leveling action is derived from a pitch sensing device (not shown). This device is typically an electrical switch which may be a capsule containing a pool of mercury to make contact with one or more electrodes therein thereby closing circuits to provide power to the linear actuator 48. It may be seen in FIG. 4C, for example, that as the wheel 38 is more elevated than in FIG. 4B, the further retraction of strut 52 provides for the proper leveling of the seat. This leveling action is continued as the wheel 38 becomes more elevated to the point shown in FIG. 4D wherein the alignment of wheels 36 and 38 is substantially at the angle of the stairs.

Figure 4H:
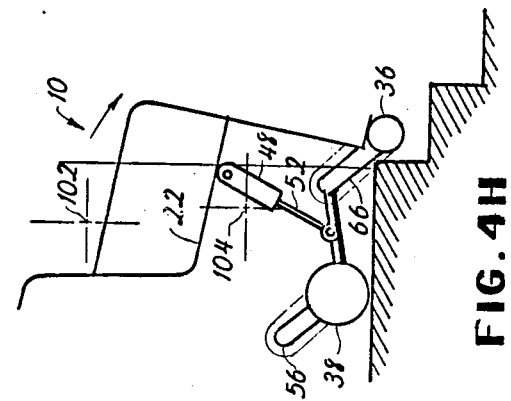

When the chair reaches the upmost tread of a set of stairs, a reverse operation of the leveling mechanism is needed because the seat support 22 tend to tip downwardly at the rear (see FIG. 4E) causing the occupant to be tipped dangerously backward. Thus, the strut 52 must be extended to bring about a leveling of the seat. This is continued as shown in FIG. 4F until the wheels 36, 38 are again on a substantially level plane and the seat is in a position similar to that of FIG. 4A.

Figure 4G:
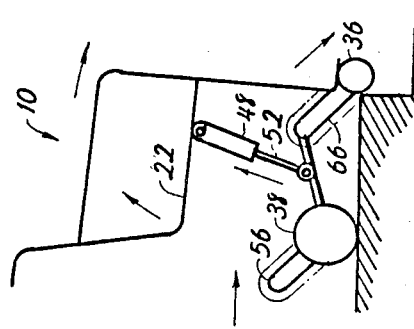
Figure 4F:
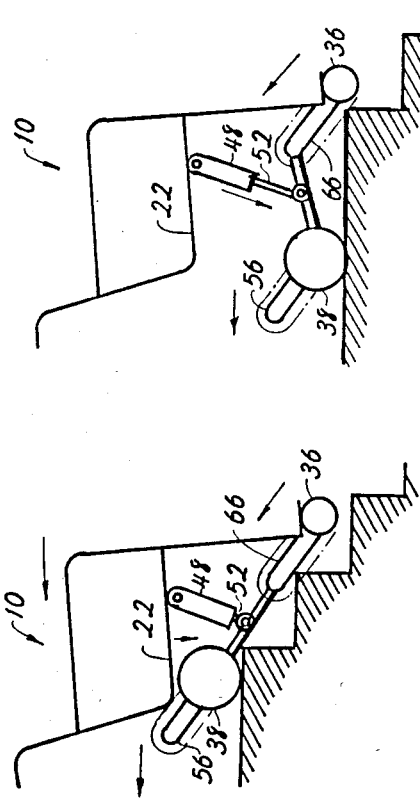

A reverse procedure is needed as the chair descends a set of stairs as illustrated in FIG. 4G. As the wheel 36 moves over the edge of a stair tread, the seat support 22 is again tipped forward which would, if not corrected, tilt the occupant forward to an extreme degree causing the center of gravity to move forward. Thus, as shown in FIG. 4H, it is desirable at all time to keep the center of gravity 102 of an occupant in the chair rearward of the total center of gravity 104 of the occupant plus chair.

The major elements with regard to the climbing of a stair with the present invention are the driven wheels 38, the climbing chain 56 and lugs 58 associated therewith together with the climbing chains 66 and lugs 68 associated with the front of the chair. Referring now to FIG. 5, shown therein is one embodiment of a lug, (e.g., lug 58) which may be used with a climbing chain. This lug has a generally Y-shaped body 106 with one arm thereof pivotally attached to a chain 108 with a pivot pin 110 passing transversly through the chain in place of a normal chain pin. The second arm of the body 106 contains a bar 112 which is held against the surface of the chain 108 by a spring (not shown) anchored at pin 110. This permits the body to tip as shown in the phantom drawing whereby the body 106 moves to position 106'. The bottom leg of the Y-shaped body 106 is provided with a resilient pad 114 for a nonslip engagement with a step or other obstacle that is encountered by the lug 58.

A typical operation of the chain 108 (e.g., chain 56 of FIG. 1) and the lug 58 are illustrated in FIG. 6. In this particular figure, the sprockets for supporting the chain 108 are not shown so as to add simplicity to this drawing, but it will be understood that there is a sprocket at both ends of the chain 108. As stated above, this chain may be driven using the same mechanism as used to rotate the wheel 38. It may be seen in this figure that rotation of the wheel 38 causes the wheel to first move generally horizontally on a stair tread 116a in a direction as indicated with the arrow 118. Then, as the chain 108 is rotated, the lugs 58 move in the motion shown in phantom format until the pad 114 thereof contacts a stair thread 116a. Thereafter, the wheel 38 moves in an angularly upward direction as shown by arrow 120. As the chair is lifted through contact of the pad 114 upon tread 116b, the continued movement of chain 108 causes the lug in advance of that in contact with the tread to move from the tread and move downwardly with the chain as shown. As illustrated, when a lug 58' moving downwardly with the chain contact the nosing 115b of the tread 116b, the lug rotates inwardly (against the force of the aforementioned spring) thereby permitting a maximum grasp of tread 116 by lug 58. This action is continued at each step that is encountered on the stairs. It will be noted that the lower end of the chain 108 adjacent to the wheel 38 is sufficiently elevated above a tread 116a that the lugs 58 do not contact the stair tread that is contacted by the wheel 38.

Figure 7:
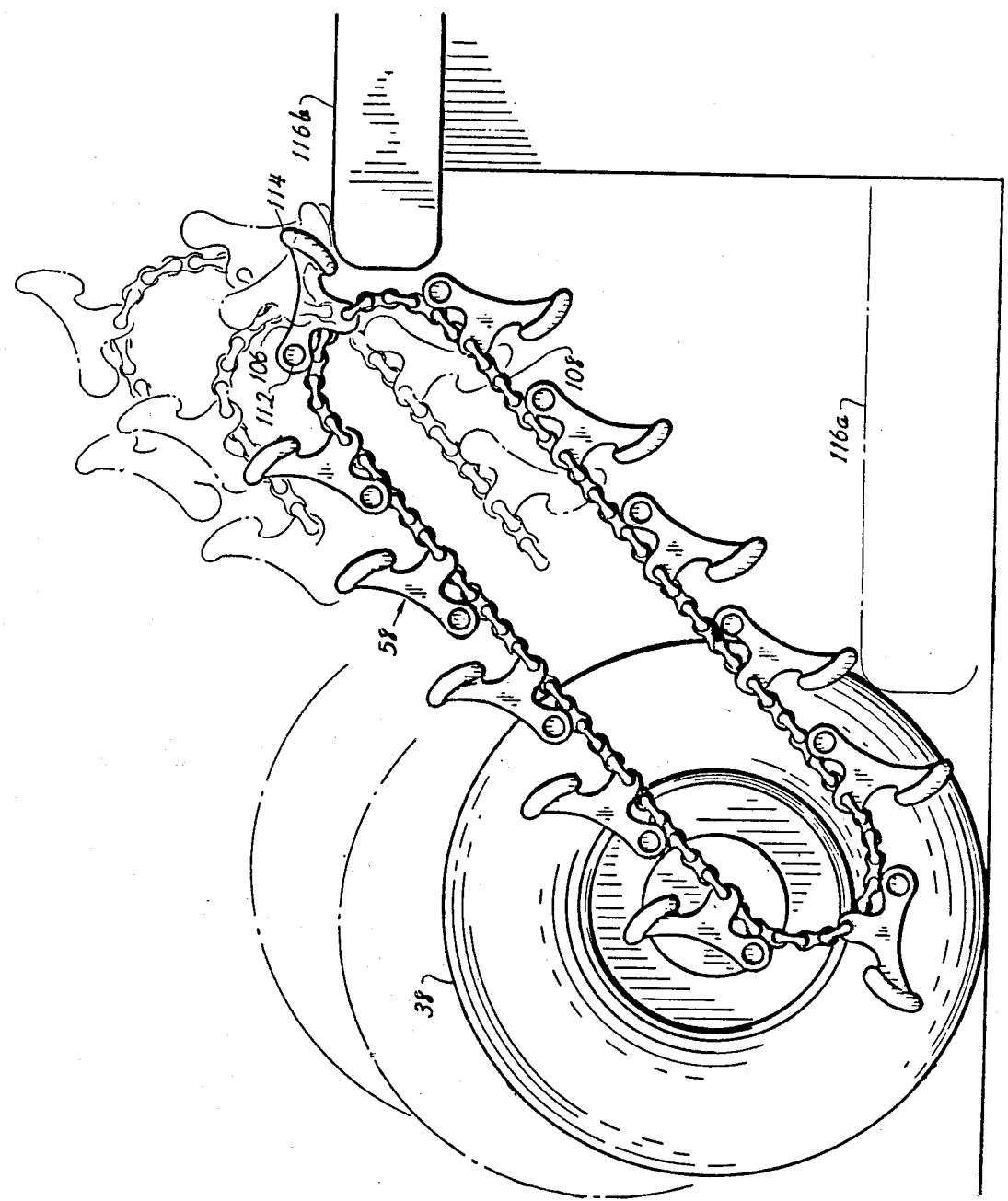
FIG. 7 is a drawing illustrating operation of the lug and chain of FIG. 5 when climbing stairs of greater pitch than in FIG. 6.

FIG. 7 is closely related to that of FIG. 6 except that the respective pitch of the stairs is increased. It will be seen that with increased pitch, the lugs 58 engage the step tread in a slightly different manner. However, they provide the same lifting for moving the chair up a set of stairs. It may be seen also in both FIGS. 6 and 7 that if the direction of the chain is reversed, as when descending a set of stairs, the lugs 58 engage the next lower stair tread and progressively move downward in a step wise manner.

Figure 9:
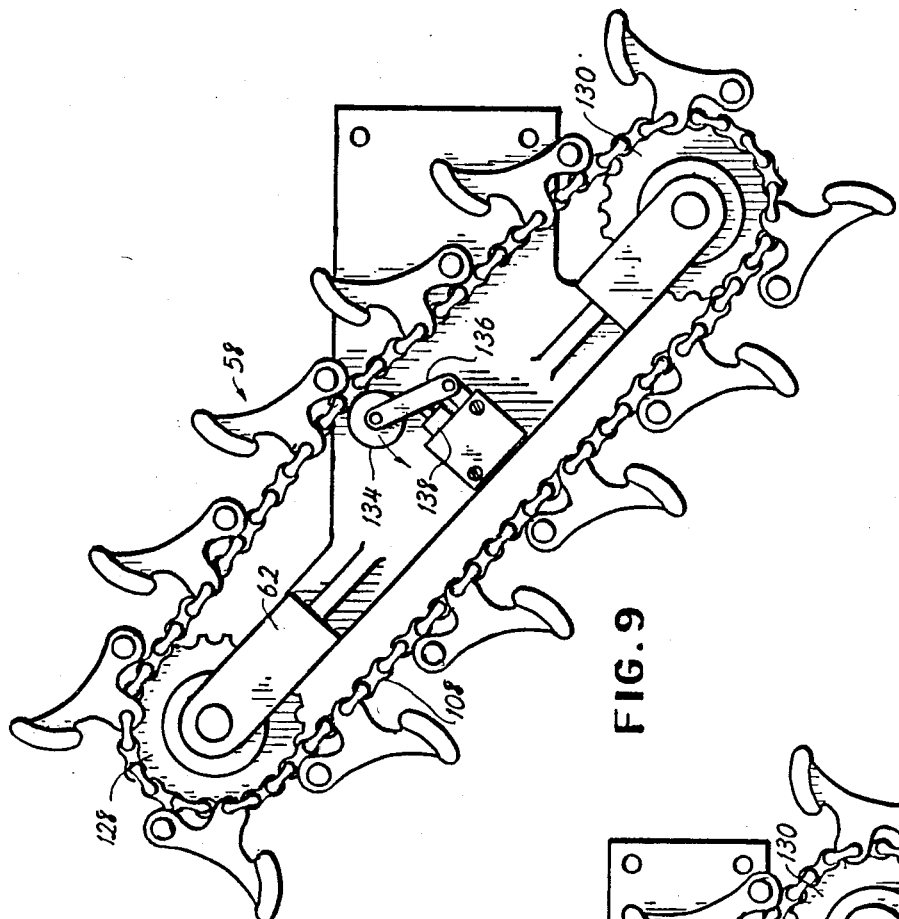
FIG. 9 is a drawing illustrating another embodiment for tensioning a climbing chain.
Figure 8:
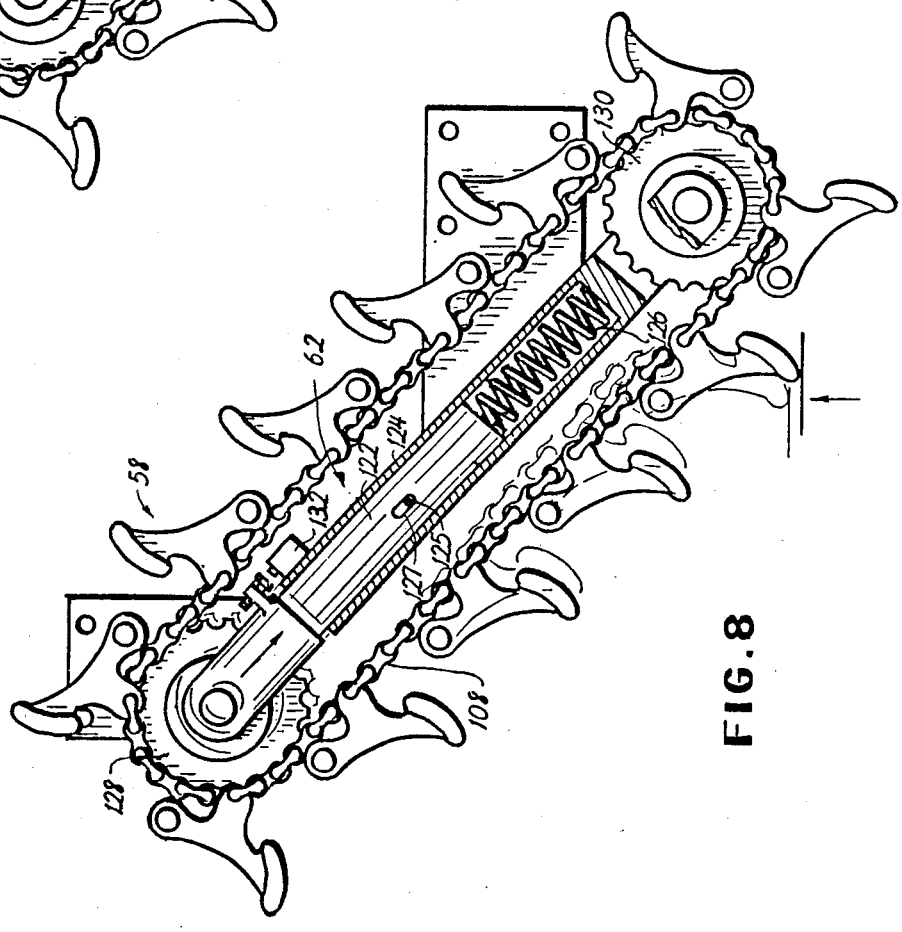
FIG. 8 is a drawing illustrating one embodiment for tensioning a climbing chain.

Whenever the lugs are engaged with a step, a considerable force is applied to the chain 108. In order to prevent excessive strain upon the chain 108, it is desirable to effectively provide for some slack therein. The mechanisms shown in FIG. 8 and FIG. 9 are typical of the manner in which this slack may be provided. The two embodiments are versions of the support bar 62 illustrated in FIG. 1. In FIG. 8, for example, the support bar 62 comprises a piston 122 within a cylinder 124. The piston is biased outwardly from the cylinder 124 with a helical spring 126, for example. The range of travel of the piston 122 within the cylinder 124 is set, for example, by a transverse pin 125 and a slot 127. The force of the spring normally maintains the sprocket 128 (like sprocket 59 of FIG. 1) at its extreme position from the sprocket 130 (like sprocket 85 of FIG. 2) which sprockets support the chain 108. Shown in this figure also is a switch 132 which can be included in an electrical circuit to give rise to a control signal when excessive stretching of the chain 108 occurs or even breakage thereof.

A second chain tensioning embodiment, which is shown in FIG. 9, provides for a fixed relationship of the sprocket 128 with respect to the sprocket 130. A certain flexibility is given to the chain 108 by the idler wheel 134 pivotally mounted from the support bar 62 with arm 136. In this embodiment, a switch 138 operated by the arm 136 provides a signal when excessive stretching of the chain 108 occurs or when breakage thereof occurs.

A preferred embodiment of a lug 58 is illustrated in FIG. 10. This is a deployable lug in that during contact with a stair tread at least a portion thereof extends a greater distance from its support chain; and when not in contact, all portions are closer to the chain. It is fabricated with a trigger bar 140 which is pivotally attached to one end to a driving chain 142 with a pin 144. Also, an elongated stair tread engaging arm 146 of the lug is pivotally attached at one end to the chain 142 with a pivot pin 148. The lug is held with the trigger bar 140 in the position shown with a spring (not shown) when the stair tread engaging arm 146 is not in use. The opposite end of the stair tread engaging arm 146 is provided with a resilient pad 150 to assure non-slip contact with a stair tread such as 152. Connecting the trigger arm 140 with the stair tread engaging arm 146 is operator bar 154 pivotally attached to the other arms with pins 156, 158, respectively. Shown in this view, in phantom lines, are positions of the engaging arm 146' as the trigger bar 140' engages the stair tread 152 and the chain 142 descends along the stairs. As seen, this causes the step engaging arm 146 with its resilient pad 150 to securely rest on top of the stair tread 152.

Further operation of the preferred deployable lug is illustrated in FIG. 11 where it is shown in relationship to the driven wheel 38. In this view, it may be seen that if the pad 150 of the step engaging arm 146 does not contact the stair tread 152, the trigger bar 140, through the spring-loaded operation of the connecting operator bar 154, is drawn into a retracted position whereby no portion of the lug 58 contacts a stair tread. Thus, by comparing FIGS. 10 and 11, it may be seen that the deployable lug 58 is extended to contact the stair tread 152 if either the trigger bar 140 or the tip of the step engaging arm 146 contacts the stair tread. This deployment occurs essentially in the same manner whether the chair is ascending a set of stairs or descending a set of stairs.

Figure 13:
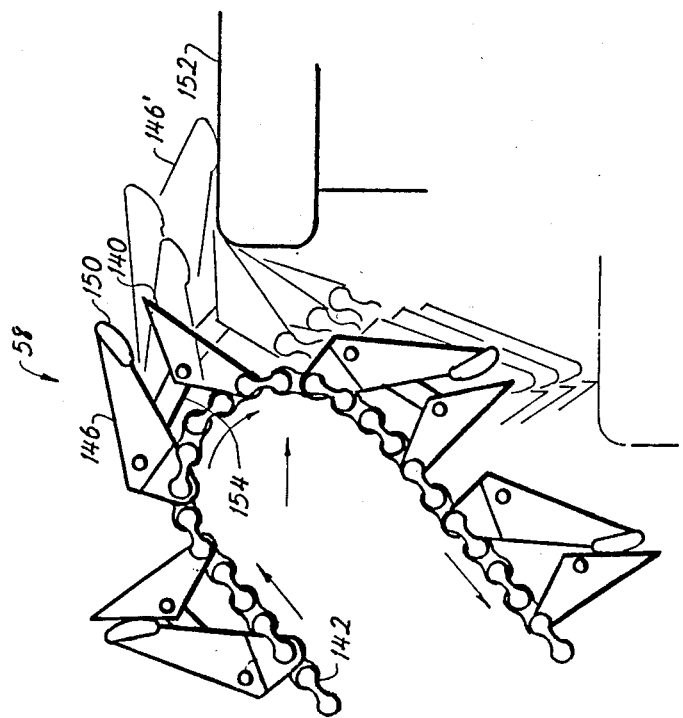
FIGS. 12 and 13 are illustrations of the operation of the climbing lug and chain of FIG. 10 on stairs of different pitch.
Figure 12:
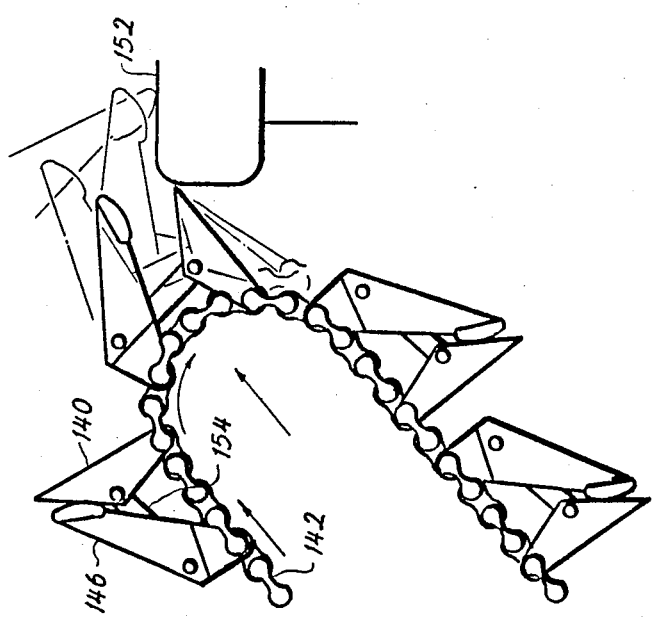

The operation of the preferred deployable lug is further illustrated in FIGS. 12 and 13. The motion of the individual components as the chair ascends, with the chain 142 moving in the direction shown, brings about an engagement of pad 150 with the stair tread 152 and thereby assures the firm grasp of the stair tread as the chain (and the chair) ascend the stairs. The only difference between FIG. 12 and FIG. 13 is a showing as to the operation when the pitch of the stairs is greater in the case of FIG. 12 than in the case of FIG. 13.

Figure 14:
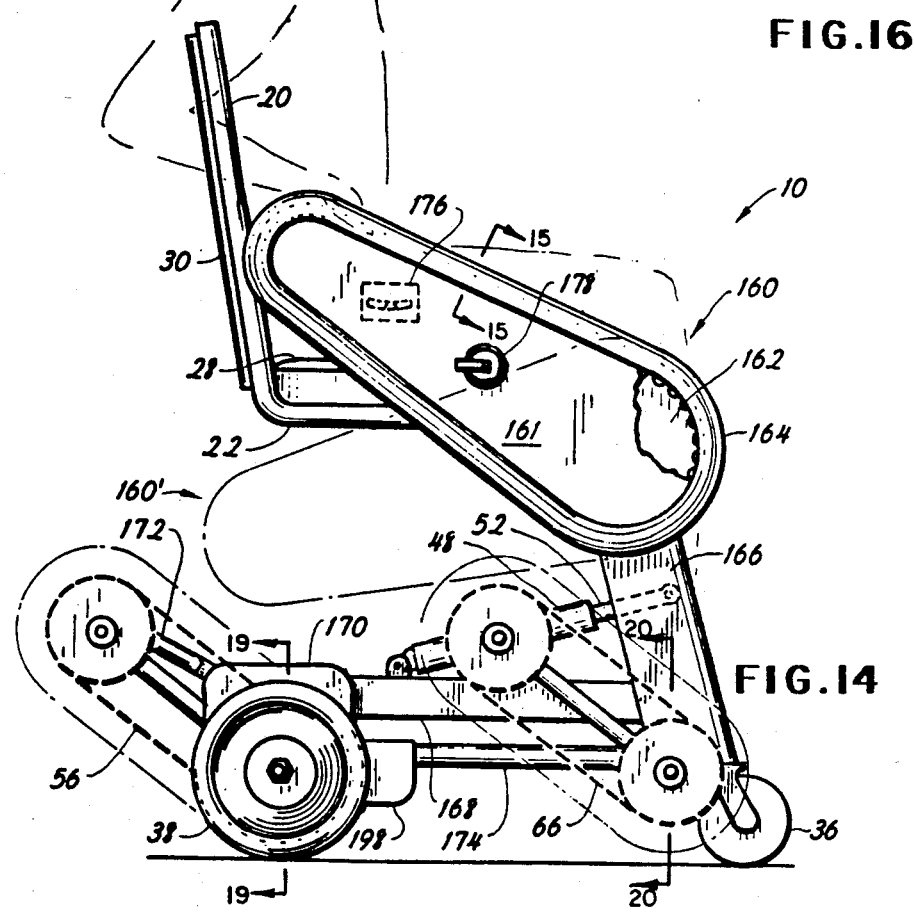
FIG. 14 is a side elevation of another embodiment of a wheel chair employing the present invention, and specifically for powering by the occupant.

A generalized embodiment of a wheel chair which is provided for the manual operation by the occupant is illustrated in FIG. 14. In this embodiment, the arm rest 26 and arm support 16 (of FIG. 1) are removed and a motion operator mechanism 160 is substituted therefor. This operator mechanism 160 is provided with a pair of sprockets (only sprocket 162 shown) which carry a separate chain (see FIG. 15). The sprockets and chain are enclosed with a panel 161. Covering the edges and outer surface of the chain is an endless grip 164 which may be grasped by the hand of an operator 165 and caused to be moved, whereby the chain and the sprockets are moved. The center of rotation of the sprocket 162 is fixed to a housing 166 which replaces, or attaches to, the front leg 18 of FIG. 1, and the entire mechanism 160 is permitted to rotate about that axis of sprocket 162 so that it may be moved to a position shown in phantom 160'. When in the "up" position, the operator mechanism 160 may be locked by any suitable means to provide an arm rest when the chair 10 is not in motion and eliminates movement thereof during operation of the endless grip 164. In this position, the orientation of the top of the operator 160 is such as to permit most effective operation by the occupant 165. When dropped to the position 160', the occupant may move sideways off of the seat 28 or enter the chair in the same position.

The motion of the grip 164 is conveyed through a chain drive or a similar mechanism (not shown) contained within the housing 166 whereupon it is transferred along arm 168 to a transmission within housing 170. A shift lever 172 is associated with the transmission for the purposes described hereinafter. As in FIG. 1, the driving wheels 38 may rise with respect to the position of the caster wheels 36 through the parallel relationship of the arm 168 and arm 174. In this embodiment, the leveling mechanism (cylinder 48 and strut 52) are connected between the arm 168 and the aforementioned housing 166. Its functioning is the same as that discussed with respect to FIG. 4.

Various occupant-operated controls may be built into the operator mechanism 160. For example, the housing thereof may contain a level sensing switch 176 and a latch 178 for releasing the operator mechanism 160 for pivotal movement thereof. As in FIG. 1, this embodiment is provided with a pair of climbing chains 56, 66 on each side of the wheel chair with their lugs (not shown) extending therefrom.

Figure 15:
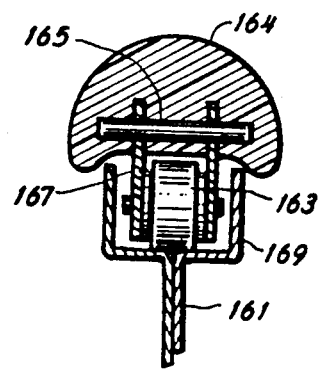
FIG. 15 is a cross-section of an endless grip used by the occupant powering the wheel chair of FIG. 14.

A partial cross-section of the operator mechanism 160 is illustrated in FIG. 15. The endless grip 164 is typically attached to a roller chain 163 with oversized rollers and with a plurality of crossbars 165 supported on arms 167. The roller chain 163 runs in a U-shaped channel 169 formed as part of the panel 161 which provides support for the chain.

Figure 16:
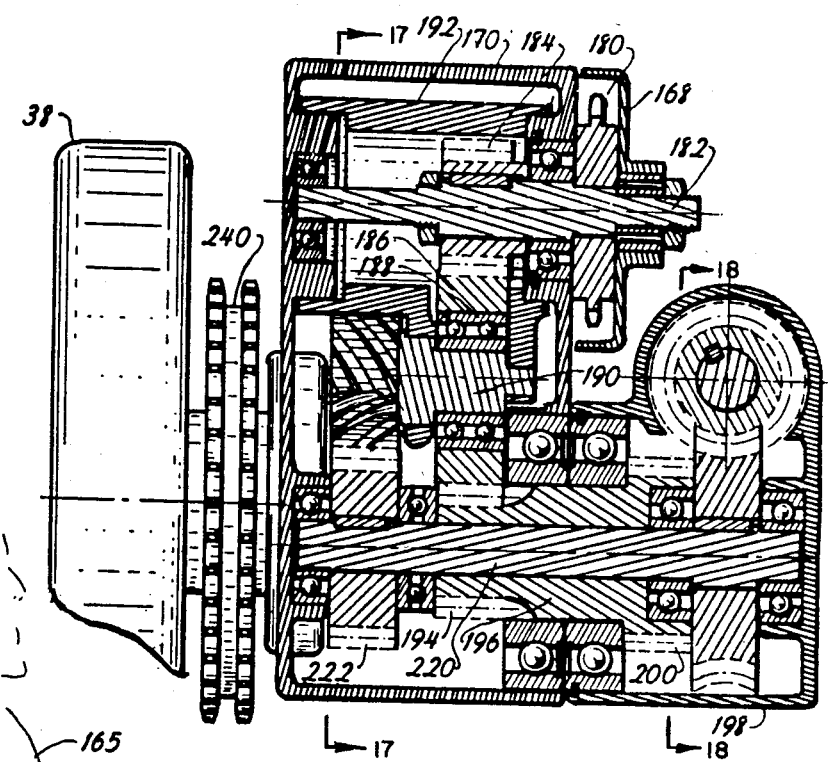
FIGS. 16 through 20 are cross-sectional drawings of a typical drive train and transmission for the wheel chair of FIG. 14.

It will be recognized by those versed in the art that different amounts of power must be applied to a driving mechanism when the wheel chair is moved across a relatively flat surface in contrast to that required for the climbing of stairs. In addition, means must be provided in manually-operated units whereby the wheel chair does not move when the occupant removes his driving force from the endless grip 164. Provisions for the change in the power to the climbing chains, etc., as well as the locking feature, are provided in this embodiment in the aforementioned transmission within housing 170. The details of a transmission to accomplish both the power shifting and the locking feature of the invention are illustrated in FIGS. 16 through 19. Referring first to FIG. 16, the input to the transmission in housing 170 is through sprocket 180 which is driven by a chain (not shown) within the arm 168 (see FIG. 14). This sprocket 180 is attached to shaft 182 which in turn carries a gear 184 that is always in mesh with gear 186 which is supported by bearings 188 on a shaft 190.

Figure 17:
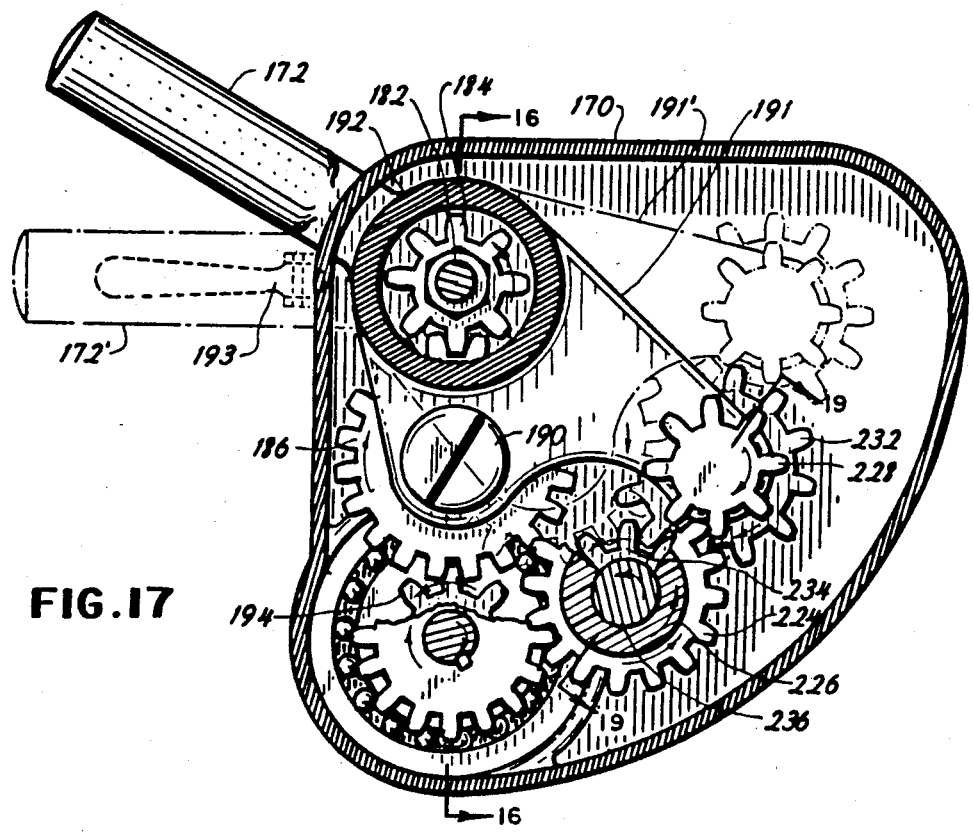
Figure 18:
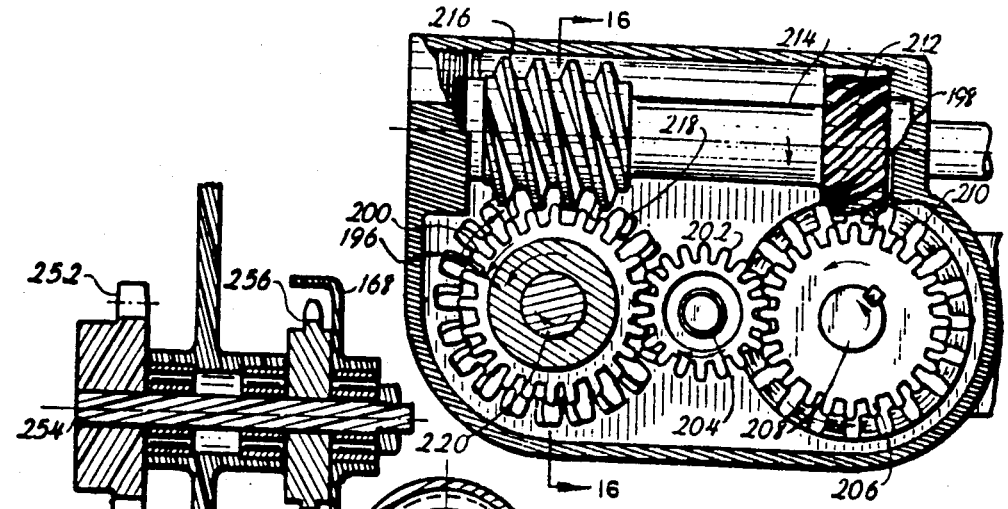

Referring now to FIG. 17 in combination with FIG. 16, the shaft 190 carrying bearing 188 and gear 186 is mounted within a carrier 191 which pivots about the aforementioned shaft 182. Also, a sleeve 192 attached to the carrier rotates about this shaft 182. Attached to this sleeve is the aforementioned shifting lever 172. The lever 172 may have two positions: a position to give full drive to the wheel 38 and to a climbing chain (not shown); or may be in position 172' using a detent 193 into the housing 170 in which position the gear train is disengaged from the wheel 38 (carrier moved to position 191'). When the lever 172 is in the position shown in solid lines, gear 186 is meshed with gear 194. Referring back to FIG. 16, the gear 194 is attached to or formed as part of a hollow shaft 196 which extends into the rear portion of the transmission contained in a housing 198 which is rotatable with respect to housing 170. Attached to the rearward end of shaft 196 or formed as part thereof is gear 200. It may be seen that, now referring to FIG. 18, gear 200 meshes with gear 202 carried on shaft 204. Gear 202 is an idler gear which transfers rotary motion to gear 206 attached to shaft 208. Also attached to shaft 208 is a worm gear 210 which rotates in the same direction. Gear 210, in turn, meshes with worm 212 attached to shaft 214. The shaft 214 extends rearwardly to carry a second worm 216, and in the opposite direction through the case 198 for the purposes described hereinafter. The worm 216 meshes with worm gear 218 carried on shaft 220. This shaft 220 extends back into housing 170 through the center of the aforementioned hollow shaft 196.

Figure 19:
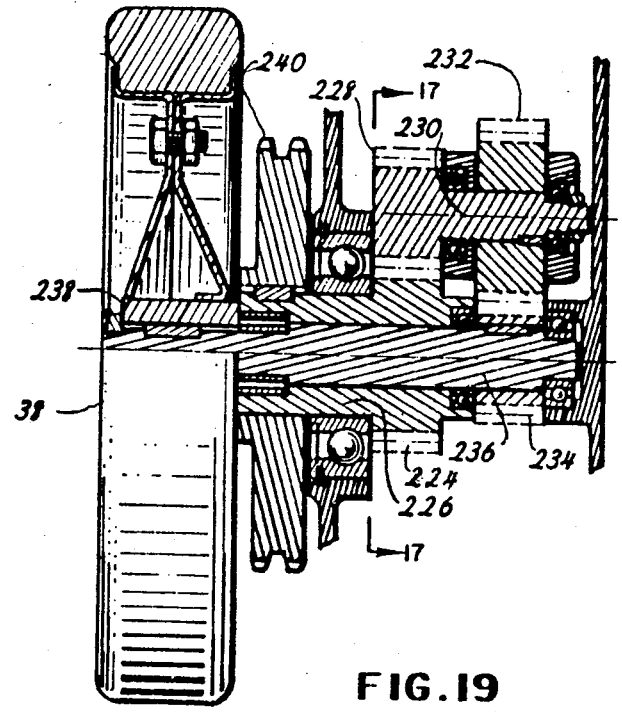

As shown in FIG. 16, attached to the opposite end of shaft 220 is gear 222 which meshes with gear 224 shown in FIG. 19. This gear 224 is attached to, or formed as part of, a hollow shaft 226. The gear 224 meshes with gear 228 carried on the shaft 230, and to this shaft 230 is attached gear 232. The gear 232 in turn meshes with gear 234 attached to one end of the shaft 226 (see FIG. 17). The opposite end of the shaft 236 is attached to the hub 238 of the wheel 38, which wheel is the driving wheel for moving the wheel chair of the subject design.

The hollow shaft 226 carries at its outward end a drive sprocket 244 for carrying the aforementioned climbing chain (not shown).

It will be apparent that the rotary speed or velocity of the driving wheel on each side of the wheel chair must be different than the speed of the climbing chain. This difference is necessitated due to the substantially horizontal movement of a wheel on a stair tread but a continuously angular movement of the climbing chain. The particular difference in rotational velocity depends upon the size of the wheel, the orientation angle of the climbing chains, etc. Generally the surface speed of the wheel should equal the horizontal motion vector of the chain. This obviates the possibility of wheel-generated friction that would dislodge a lug from a stair tread. The needed control of this difference in a particular transmission is accomplished through the choice of gear sizes within the transmission.

When the shift lever 172 is moved to position 172', the carrier 191 is rotated about the center of shaft 182 to position 191' whereby gear 186 is no longer engaged with gear 194. In addition, gear 232 is disengaged from gear 234. The disengagement of these gears removes any driven force being applied to the wheel 38 and the driving force to the sprocket 240. However, the gears connecting the sprocket remain connected to the combined worms and worm gears in housisng 198 thereby providing a braking action to the sprocket 240 and thus to a driving chain attached thereto. In this manner, although force may be applied to the driving chain, as from the weight of the occupant and the chair, no motion can occur to the wheel chair itself. This same braking action occurs when the gears are completely meshed as when the lever 172 is in its raised position. Thus, when an occupant in the wheel chair removes the pulling force on the endless grip 164, the wheel chair will maintain its position until additional force is applied by the occupant.

Figure 20:
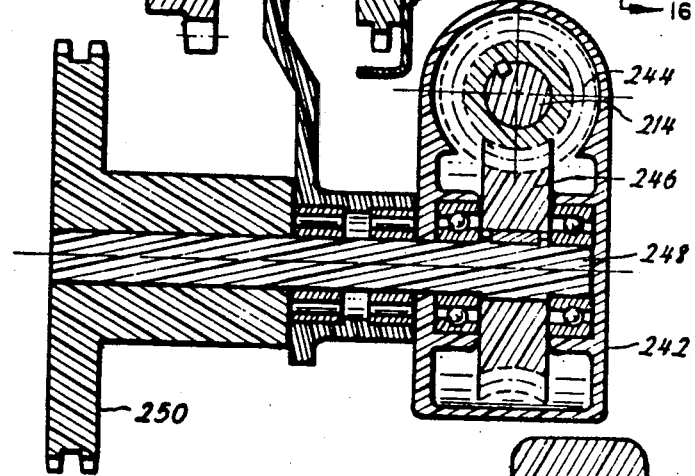

As discussed above, the shaft 214 extends out of the gear case 198 in a forward direction, i.e., toward the caster wheels 36, through lower arm 174 (see FIG. 14). At the extreme end of this arm 174 is a housing 242 as shown in FIG. 20. The shaft 214 terminates within this housing 242, and attached at the end thereof is a worm gear 244. This gear meshes, in turn, with worm gear 246 attached to shaft 248. The opposite end of shaft 248 carries a sprocket 250 which is the drive sprocket for the aforementioned climbing chain 66 (not shown in this figure). Also shown in FIG. 20 is a sprocket 252. This sprocket carries a chain (not shown) that is, in turn, driven from occupant-operated system 160. The sprocket 252 is attached to shaft 254 having at its opposite end a sprocket 256. This sprocket 256 carries a chain (not shown), which chain also meshes with the aforementioned sprocket 180 shown in FIG. 16. The sprocket 256 is enclosed with a portion of the aforementioned upper arm 168 (see FIG. 14). It will be apparent to those versed in the art that when there is rotational motion to shaft 214 and thus to the sprocket 240 of FIG. 16, there will also be rotational motion directed to sprocket 150 shown in FIG. 19. Thus, the respective climbing chains connected to sprockets 240 and 250 will be driven and cause movement of the wheel chair as governed by those climbing chains. Further, the braking function of the worm gears within housing 198 shown in FIG. 18 as applied to the climbing chain attached to sprocket 240 is also applied to the climbing chain attached to sprocket 240 in FIG. 20. In addition, a further braking action is provided by the worm 244 and worm gear 246 in housing 242 (FIG. 20).

It will be noted with reference to FIGS. 16 through 20 that all of the referred to shafts are supported with appropriate bearings throughout the transmission. Furthermore, the shaft 182 of FIG. 16 and shaft 254 of FIG. 20 provide centers of rotation for the upper arm 168 which contain the driving chain over sprockets 180 and 256 which chain transmits rotary power to the transmission. In a like manner, shafts 220 and 248 provide centers of rotation for the lower arm 174.

A drive system may be provided for those instances where an occupant of the wheel chair is unable to apply sufficient force to operate the embodiment shown in FIG. 14 and the related figures. A drive train for such a power unit is illustrated in FIG. 21. In this embodiment, an electrically powered motor 258 receives current through leads 260 from an appropriate control system and drives a shaft 262 either directly or preferably through a clutch 264. This clutch 264 is typically an electromagnet type receiving appropriate current through leads 266. Details of this clutch 264 will be given hereinafter with reference to FIGS. 23 and 24. As shown in FIG. 21, the shaft 262 carries a pair of worms 268 and 270. Worm 270 meshes with worm gear 272 which in turn is attached to shaft 274. The gear 272 may be further directly attached to, or attached through appropriate gearing, to sprocket 276 which sprocket is the upper sprocket associated with climbing chain 66.

The second worm 268 carried by shaft 262 engages with worm gear 278 which is mounted on shaft 280. Also mounted to this shaft is gear 88 which couples with gears 92 and 90 (as also shown in FIG. 3). Attached to worm gear 278 is a sprocket 282 which is the lower drive sprocket of the climbing chain 56. It may be seen by referring back to FIG. 2 that the shaft 262 and the attached worms 268 and 270 are enclosed within the lower arm 44a, with the respective motor 258a and clutch 264a projecting from the end thereof. This construction is further shown in FIG. 1 where arm 44 is the lower of the parallel pair of arms 42 and 44. Furthermore, by referring again to FIG. 3, it may be seen that the gear 92 shown in FIG. 21 can be disengaged from gear 88 whereby a wheel 38 attached to shaft 40 is removed from the drive train. As in the case of the occupant-propelled wheel chair, the worm-worm gear combinations represented by gears 268, 270, 272, and 278 provide a locking or braking action for the climbing chains 56, 66 when the rotary power to shaft 262 is interrupted as by interrupting power to the motor 258, the clutch 264, or both.

Shown in FIG. 22 is a cross-section taken through the centerline of shaft 280 of FIG. 21. When considered together with FIG. 3, it may be seen that the climbing chain sprocket is mounted (rotatably) within housing 62. Immediately adjacent, in lower arm 44, are the worm gear combination 278, 268 for the rotation of shaft 280. In pivoted relationship with arm 44 is housing 86 containing therein gear 88 (and gears 90, 92, not shown) of the transmission for a driving wheel.

The details of a typical clutch unit 264 are illustrated in FIGS. 23 and 24. Mounted within a housing 284 is an annular electromagnet 286. Slidably mounted coaxially within the electromagnet 286, is a clutch armature 288 which is slidably between engagement with an input clutch plate 290 and an output clutch plate 292. The ends of the armature 288 and the faces of the clutch plate 290, 292 are provided with appropriate serrated surfaces e.g., 289, 291, for positive engagement thereof. The input clutch plate 290 is connected to a shaft 294 which originates within the aforementioned motor 258. The shaft 262 extends into the center of the armature 288 and terminates in a gear 296 which is shown in FIG. 24. The aforementioned armature 288 is provided, on its interior surface, with gear teeth 297 mating with three planetary gear 298, 300, and 302. It will be recognized by those familiar with planetary gears that when the clutch is in a position as shown in FIG. 23, the armature 288 rotates with the shaft 294 from the motor thereby driving the gear 296 and its attached shaft 262 at a speed less than the speed of the input shaft 292 from the motor. This reduction provides additional torque for the shaft 262 and thus power for the climbing chains 56 and 66 (of FIG. 21) during climbing operations of the wheel chair. However, when the electromagnet 286 is properly energized, the armature 288 moves into engagement with the output clutch plate 292 thus the armature 288 becomes fixed in a housing 284 and essentially a direct drive with regard to the speed of the input motor 258 occurs at a higher speed with less torque being delivered to the shaft 262. This condition is appropriate for transporting the wheel chair across relatively level surfaces where less torque is required.

Power delivered to the motor 258 (and a corresponding motor on the second side 258b, (see FIG. 2) may be controlled in any desired manner. For example, the operator may utilize the equivalent of a "joy" stick which applies an appropriate amount of current to each of the two motors thereby driving the wheel chair in a direct path or turning from left to right.

It will be appreciated that if the various climbing chains are rotated at the same speed as the wheel chair is either ascending or descending stairs, at least one climbing chain on each side of the chair will be in supportive contact with one or more stair treads. However, the second climbing chain on a given side of the chair may, or may not, be in supportive contact with the stair. In order to illustrate this eventuality, FIGS. 29A, B and C are provided, depicting climbing chains at various locations on a stair. For simplicity, the various lugs are diagrammatically depicted at 340 in such figures.

Figure 29:
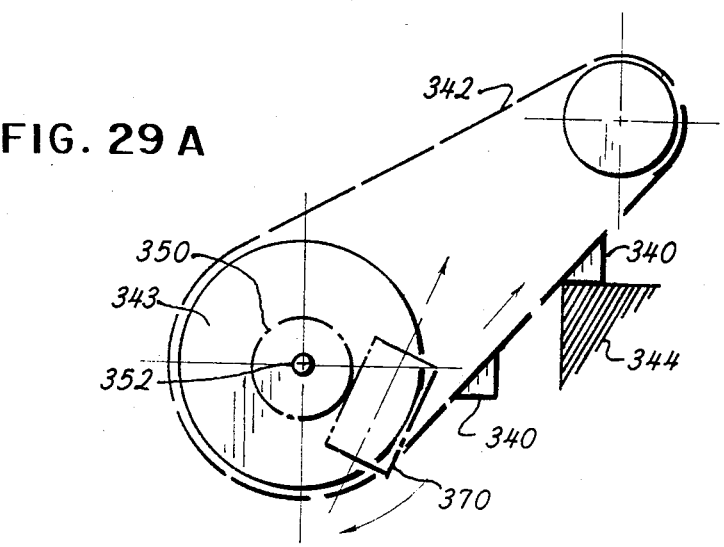
FIGS. 29A, B and C are diagrammatic side elevations of a climbing chain assembly of the present invention as it engages a stair.
Figure 29:
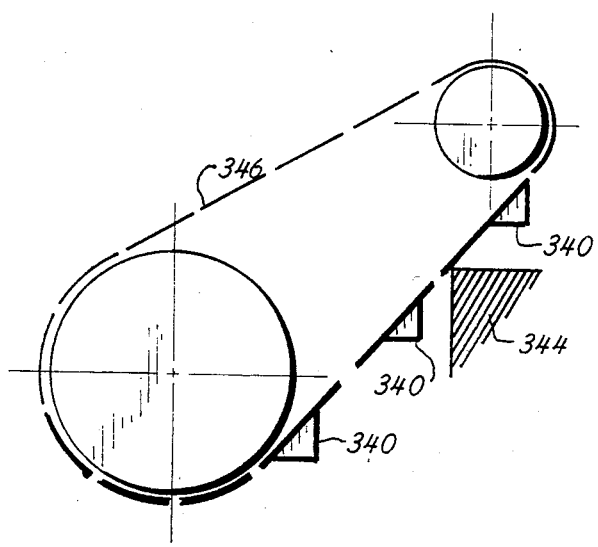
Figure 29:
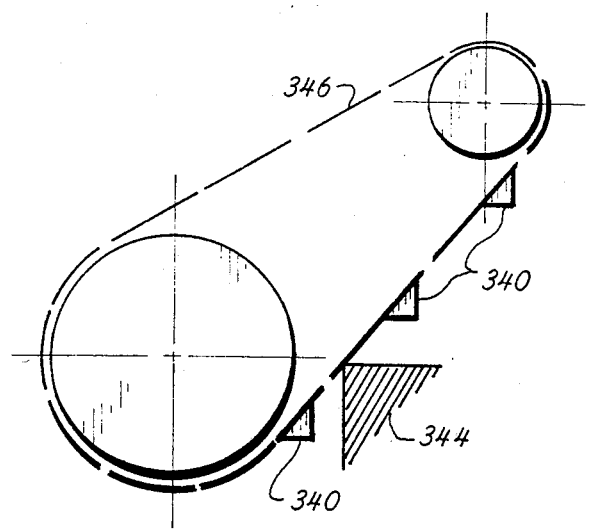

Thus, the situation may be encountered where a first climbing chain 342 driven by sprocket 343 is in supportive contact with the stair tread 344, hereinafter referred to as being in a loaded position, as illustrated in FIG. 29A, while the second climbing chain 346, on the same side of the chair, is not in supportive contact, hereinafter referred to as being in an unloaded position, as illustrated in FIG. 29B. It will be further noted that further rotation of the second climbing chain 346 will not result in supportive contact, but instead the relative positions of the climbing chain 346 and the stair tread 344 remain constant as illustrated in FIG. 29C. However, if and when the first climbing chain 342 completes tread traversal, supportive contact must be provided by the second climbing chain 346, which, as discussed above, may not be in a loaded position. When this occurs, there may be a hesitation in the transmitted power or a slippage of the entire chair downwardly until a lug on the second climbing chain makes supportive contact with the stair tread. This hesitation or slippage may prove frightening to the chair occupant and may cause shock loading of the lugs, climbing chain, or the complete power train. Additionally, in instances where only one climbing chain on each side of the chair is loaded, failure of one lug, a climbing chain, or the drive train or component thereof may cause the chair to pitch sideways, frightening and/or dislodging the occupant from the chair, and causing shock loading of lugs, climbing chains and/or the drive train.

Therefore, it is desirable to have both climbing chains on each side of the chair in the loaded position such that hesitation and slippage is avoided, and such that failure of a lug or other component does not destabilize the chair. To accomplish this simultaneous, or near simultaneous, loading of the various climbing chains, a means for selectively varying the relative rotational speed of the various climbing chain is provided. Such means facilitates loading by moving an unloaded climbing chain relatively faster than a loaded climbing chain and in the same direction when the chair is ascending a stair, and by moving a loaded climbing chain relatively faster than an unloaded climbing chain when the chair is descending a stair.

Figure 30:
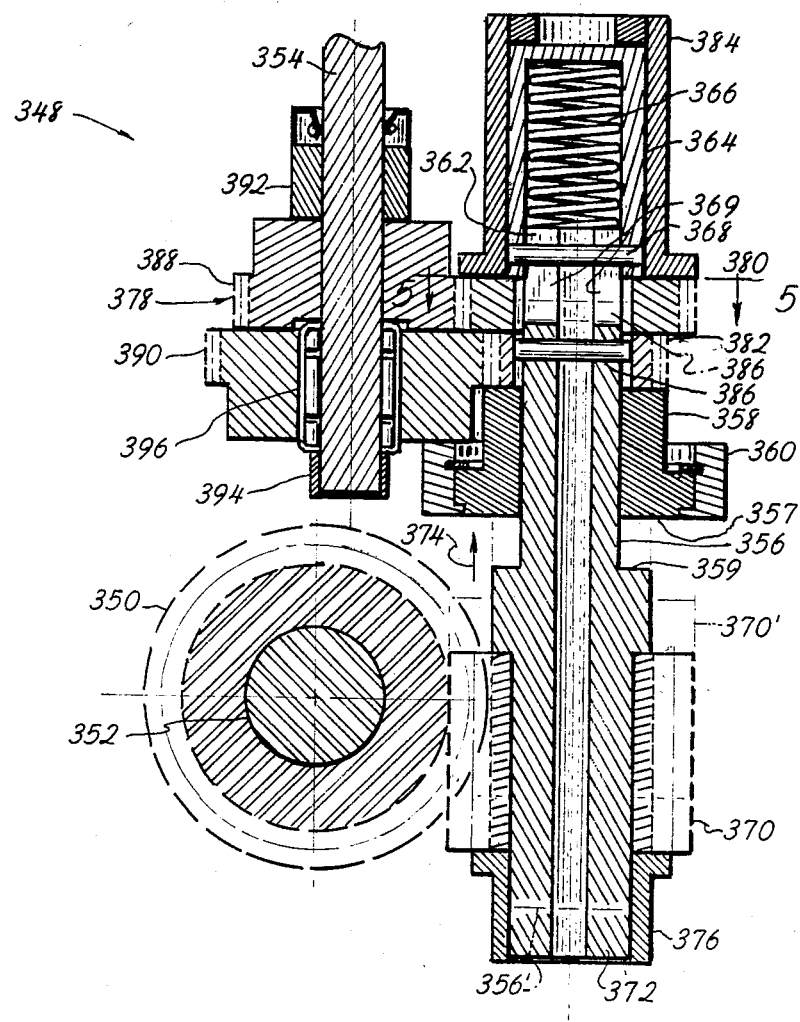
FIGS. 30 and 31 are cross-sectional drawings of the means for selectively varying the relative rotational speed of the various climbing chains of the present invention.

One embodiment of such means for varying the rotational speed of a climbing chain is illustrated at 348 of FIG. 30, and it will be understood that each climbing chain will be provided with such means. In the illustrated embodiment of FIG. 30, a worm gear 350 mounted on shaft 352 (comparable to worm gears 88 or 272, and shaft 280 or 274 of FIG. 21) is depicted for selectively rotating the sprocket 343 (see FIG. 29A) which in turn rotatably drives a climbing chain. Also depicted is a drive shaft 354 (comparable to shaft 262 of FIG. 21) for rotatably driving the speed varying means 348 and resultantly, the worm gear 350. The speed varying means 348 comprises a speed shifting shaft 356 rotatably and slidably journaled through the bearing 358 housed within the bearing housing 360 so as to provide for axial reciprocation of the shaft 356 as it is received through bearing 358. It will be noted that the shaft 356 is provided with a shoulder 359 which serves to rotatably abut against the rearward bearing surface 357 of bearing 358 when the shaft 356 is reciprocated forwardly in the direction of arrow 374 thereby limiting the axial travel of shaft 356. A first end portion 362 of the shaft 356 is received in a spring retainer 364 for housing a spring 366. The spring 366 serves to rearwardly spring bias the speed shifting shaft 356, with a spring retainer orientation pin 368 being provided which is received through a corresponding slot 369 in the shaft 356 thereby causing the retainer 364 and spring 366 to rotate with the shaft 356 such that the spring 366 is not inadvertently unwound and wound by the rotation of the shaft 356.

The speed varying means 348 is further provided with load sensing means for sensing whether the associated climbing chain is loaded or unloaded. In this particular embodiment such load sensing means comprises a worm gear 370 fixedly mounted on a second end portion 372 of the reciprocating speed shifting shaft 356. As illustrated, the worm gear 370 drivably meshes with the worm gear 350. Thus, it will be appreciated that when the climbing chain 342 becomes loaded, the associated drive sprocket 343 and worm gear 350 are loaded, resulting in the loading of the meshing worm gear 370 (see FIG. 29A). This loading of load sensing worm gear 370 forces the worm gear 370 and the speed shifting shaft 356 forward in the direction of arrow 374 to the position indicated by phantom lines 370′ and 356′, respectively, as illustrated in FIG. 30. Of course, when the climbing chain is no longer loaded, the spring 366 forces the shaft 356 rearwardly to its unloaded position. It will be noted that second end portion 372 of the shaft 356 is received in a flange bearing 376 which serves to both rotatably support the shaft 356 and to define the extent of its rearward reciprocation.

The selective reciprocation provided by the load sensing means is translated into the desired speed variation by the speed varying gear assembly illustrated generally at 378 of FIG. 30. The gear assembly 378 comprises a first loaded spur gear 380 and a first unloaded spur gear 382 both slidably receiving the speed shifting shaft 356. Whereas the shaft 356 is slidably received by the gears 380 and 382, it will be noted that the position of the gears 380 and 382 is fixed by a forward flange bearing 384 which also serves to support the spring retainer 364. Further, the shaft 356 is fixedly provided with a gear engaging pin 386 for selectively engaging either the gear 380 or the gear 382, the pin 386 being discussed in detail below. As illustrated when the worm gear 370 and shaft 356 are in the rearward, unloaded, position, the first unloaded spur gear 382 is engaged by the pin 386 such that it rotates with the shaft 356, and the first loaded spur gear 380 is disengaged. Similarly, when the worm gear 370 and shaft 356 are in the forward, loaded, position, the first loaded spur gear 380 is engaged by the pin 386 such that it rotates with the shaft 356 and the gear 382 is disengaged.

The gear assembly 378 further comprises a second loaded spur gear 388 and a second unloaded spur gear 390 each mounted on the drive shaft 354 and held in the desired axial position thereon by sleeve bearings 392 and 394 such that spur gear 388 meshes with spur gear 380 and spur gear 390 meshes with spur gear 382. It will be appreciated that different gear ratios are achieved through the combination of the spur gear 388 and 380 as opposed to the combination of spur gear 390 and spur gear 382 resulting in the shaft 356 being driven at different speeds depending upon whether the gear 380 or the gear 382 is engaged by the shaft 356. More specifically, the unloaded combination of gears 382 and 390 serve to drive the shaft 356 relatively faster than the loaded combination of gears 380 and 388.

As noted above, to facilitate the proper loading of the climbing chains, it is desirable that an unloaded climbing chain be moved relatively faster than a loaded climbing chain and in the same direction when the chair is ascending a stair. It will be appreciated that the above described gear configuration will accomplish such speed variation. However, when decending a stair, a loaded climbing chain should be moved relatively faster than an unloaded climbing chain. One way this can be accomplished is by terminating the motion of the unloaded climbing chain while allowing the continued rotation of the loaded climbing chain. Accordingly, the gear assembly 378 is provided with a roller clutch 396 of conventional design mounted between the second unloaded spur gear 390 and the drive shaft 354. The roller clutch 396 being fixedly engaged to the spur gear 390 is adapted, by means of its design and mounting arrangement, not to rotate with the drive shaft 354 when the shaft 354 is rotated in the direction required for descending a stair. However, where the direction of rotation is that associated with ascending movement of the wheel chair, the roller clutch 396 engages the shaft 354 thereby allowing gears 396 and 382 to engage when the associated climbing chain is unloaded.

Figure 31:
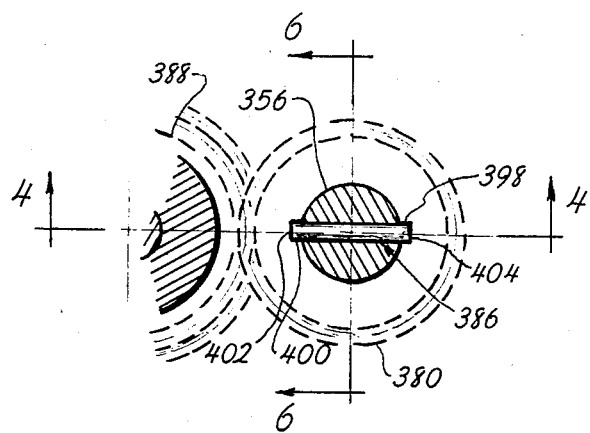

As discussed above, the gear engaging pin 386 serves to selectively engage either the gear 380 or 382 such that one or the other rotates with the shaft 356. To facilitate the selective engaging of the gears 380 and 382, each such gear is provided with a pair of oppositely disposed chases 398 and 400 aligned substantially parallel to the axis of the shaft 356 as is illustrated in FIG. 31 and FIGS. 32A and B. The chases 398 and 400 are slidably receptive of opposte end portions 402 and 404 of the gear engaging pin 386 such that, for example, when opposite end portions 402 and 404 are received in the chases 398 and 400 of gear 380, the gear 380 will rotate with the shaft 356. As illustrated in FIG. 33, each of the opposite end portions 402 and 404 of the pin 386 is provided with oppositely disposed parallel engaging surfaces 406 and 408 for slidably engaging the sidewalls of the chases 398 and 400, and further provided with oppositely disposed parallel camming surfaces 410 and 412. The lower camming surface 410 is angularly adapted to cam the engaging pin 386 forward to engage gear 380 while the upper camming surface 412 is angularly adapted to cam the pin 386 rearwardly to engage gear 382.

With regard to the angular direction of the camming surfaces 410 and 412, when the gears 380 and 382 are in the forwardly driven mode, as illustrated in FIG 32A, the gear 380 is rotated in the direction of arrow 381 while gear 382 does not rotate. Thus, the rotational movement of gear 380 relative to gear 382 is in the direction of arrow 383. In the rearwardly driven mode, as illustrated in FIG. 32B, gear 380 rotates in the direction of arrow 385 and gear 382 rotates in the same direction as illustrated by the arrow 387, but at a relatively faster speed than the gear 380. Given this increased rotational speed, the rotational movement of gear 380 relative to the position of gear 382 is in the rotational direction of arrow 383', that being the same direction as arrow 383 of FIG. 32A. Thus, given the common direction of rotational movement of gear 380 relative to gear 382, in both the forward and rearwardly driven mode, the camming surfaces 410 and 412 of the pin 386 can be sloped in a single direction and serve to cam the pin 386 to the desired gear 380 or 382 in either driven mode.

Further, it will be noted that obtuse corners 414 and 416 of the pin 386 are aligned on a common plane perpendicular to the axis of the shaft 356. This pin configuration prohibits the pin 386 from engaging more than one of the gears 380 and 382 at one time. For example, should the pin 386 be positioned as illustrated in FIG. 33, the pin 386 will either be cammed forwardly to engage gear 380 or rearwardly to engage gear 382 depending upon the direction of rotation of the shaft 356 and/or the direction of reciprocation of the shaft 356.

Further, as illustrated in FIGS. 34A–D, the chases 398 and 400 of either of the gears 380 and 382 may be provided proximate their facing surfaces with a beveled camming surface 418. As a result, it is no longer necessary that obtuse corners 414 and 416 be on a common plane and the engaging pin 386 can be strengthened without widening the chase 398 and 400.

Figure 35:
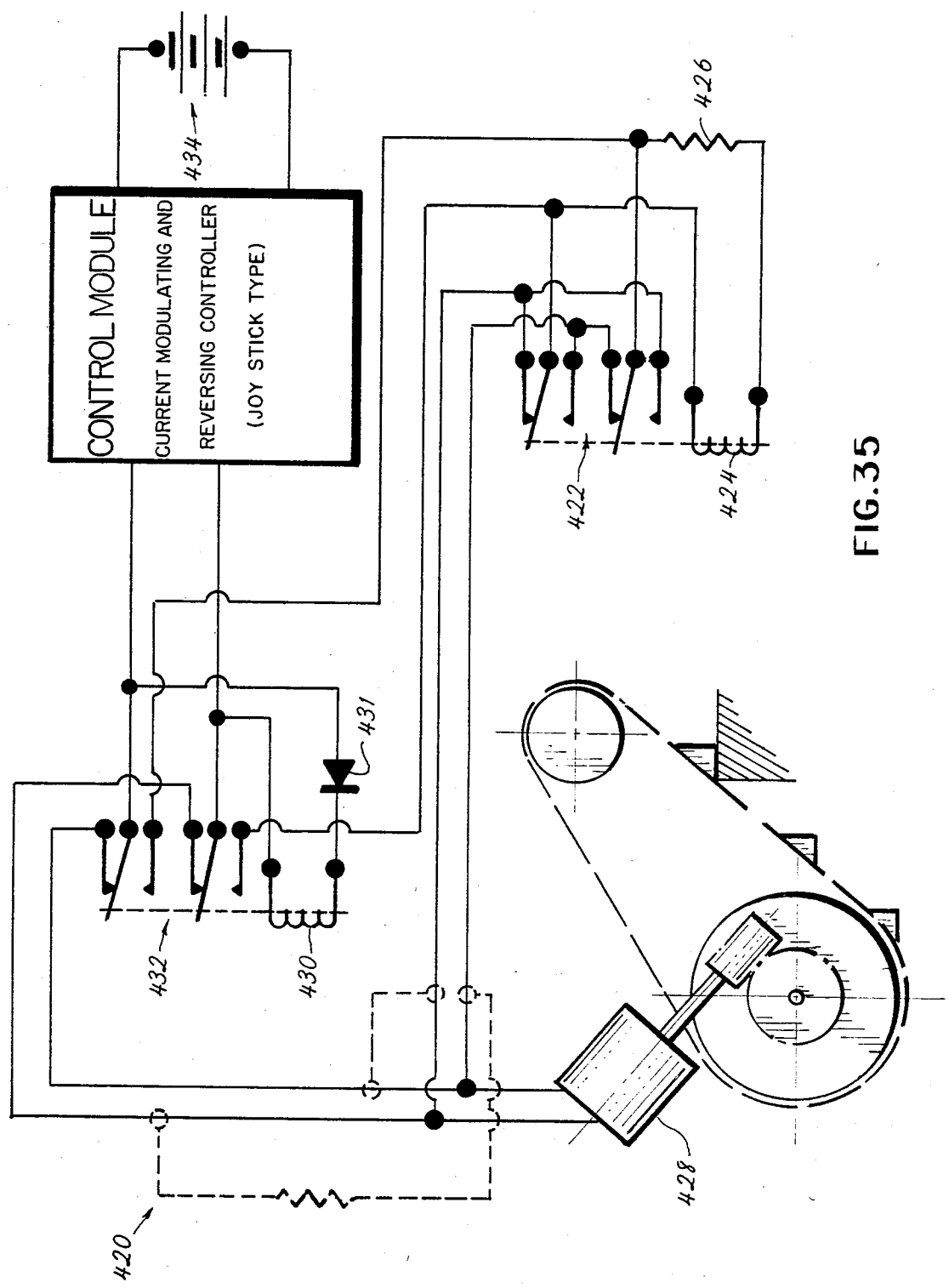
FIG. 35 is a schematic electrical circuit diagram of alternate means for selectively varying the relative rotational speed of the various climbing chains of the present invention.

An alternate electrical means for selectively varying the relative rotational speed of the various climbing chains is illustrated generally at 420 in FIG. 35. As with the previous embodiment, the speed varying means 420 comprises load sensing means for sensing whether a climbing chain is loaded or unloaded. Such load sensing means takes advantage of the fact that loading (increasing torque output) reduces the motor speed and simultaneously increases current draw. In ascending traversal, for example, the act of loading reduces the motor speed thus signaling that the particular climbing chain is loaded in descending traversal. A double pole double throw switch 422 operated by a solenoid 424 serves as load sensing means. In operation, the solenoid 424 is connected, in series, with a resister 426 as a shunting device across the power conductors supplying the motor 428. The thus positioned load sensing means acts to sense variations in the power being supplied to the motor 428 and throws the switch 422 from the normally closed position illustrated to the normally open position indicated with phantom lines. The speed varying means 420 further comprises means for selecting loaded to unloaded speed relationships contingent upon the direction of stair traversal, such means including a solenoid 430 which operates a second double pole, double throw, switch 432. The solenoid 430 is mounted in series with a diode 431 across the lines connecting the D.C. motor 428 to the battery 434. In the ascending traversal mode, the diode 431 blocks electrical flow and the switch 432 is maintained in the normally closed position as illustrated. This provides one loaded to unloaded speed relationship suited to ascending traversal wherein the freely rotating unloaded assembly moves faster than the loaded assembly and in the same direction. When polarity of the lines connecting the motor 428 to the power source 434 is reversed to produce descending traversal, the diode 431 passes electrical flow which activates the solenoid 430. The solenoid 430, in turn, moves the switch 432 from the normally closed position to the normally open position illustrated by phantom lines. The switch 432 is adapted, by means of wiring to the load sensing controlled solenoid switch 422, to produce variations in the drive speed and/or direction of rotation of the climbing chain in the loaded and unloaded conditions.

Furthermore, automatic provision may be made for correcting the direction of the wheel chair when approaching, climbing or descending a set of stairs. This latter aspect is illustrated in FIG. 25. For example, in FIG. 25A is illustrated the case where a wheel chair is backed against a set of stairs, which stairs are to be climbed by the wheel chair. As the climbing chain 56a encounters the stair tread 304, the climbing chain 56b does not contact the stair tread 304. Accordingly, the right side of the wheel chair (with respect to an occupant) tends to lift upwardly. Side-to-side, i.e., yaw level sensing switches within the chair, similar to those described above with regard to pitch leveling, interrupt the current flow through appropriate circuitry to the motor driving climbing chain 56a while current is continued to the motor driving climbing chain 56b.

This moves the wheel chair into position such as that shown in FIG 25B. Thereafter, equal amounts of current may be applied to the two motors whereby the chair climbs the stair uniformly. If there is any misalignment as the chair moves up the stairs, the same yaw level sensing switches adjust the current flow to correct the direction of travel. This might be the case when a staircase, for example, curves or turns in any manner.

Similarly, when a wheel chair is to descend a set of stairs, such as illustrated in FIG. 25C, a lowering of the right side of the wheel chair causes any power to the motor driving the right side of the chair to be interrupted; and power to the motor on the left side is continued until the chair is again aligned properly with the stairs such that the wheel chair may descend in a manner previously described.

In addition to the electrical safety switches which provide for pitch and yaw leveling, and switches which indicate excessive stretching or breaking of the climbing chains, it will appear desirable to add other safety features to the wheel chair. One such feature is illustrated in FIG. 26. In this enbodiment, a cover 306 is provided to substantially encase a climbing chain 66 which carries the lugs 58. The cover is firmly attached to one of the arms (e.g., arms 42, 44 of FIG. 1) as with appropriate fasteners through hole 308. The lower edge of the cover 306 is provided with serrations 310 whereupon, as shown in FIG. 26B, these serrations grasp a stair tread 312 if the chain 66 breaks and collapses whereby the lugs 68 no longer support the driving chain on the stair tread. It will be apparent that other safety features of this type may be utilized in connection with the wheel chair to provide additional safety to an occupant or to a person assisting a person in the wheel chair.

Figure 27:
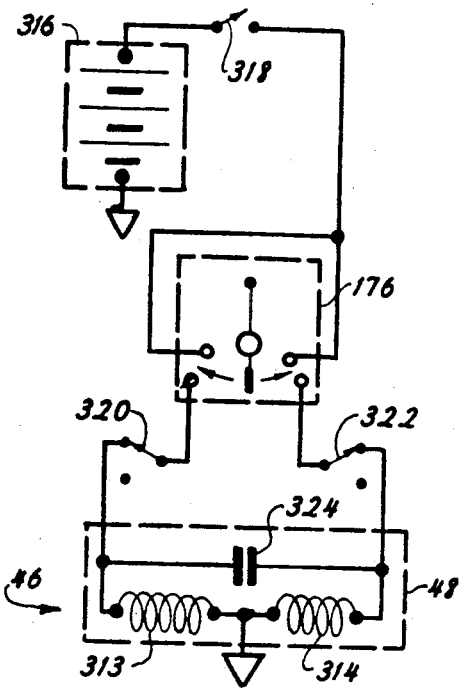
FIG. 27 is a schematic electrical circuit diagram for the operation of the leveling jack of the present invention.

It will be readily understood that a person skilled in the art will be knowledgeable of appropriate electrical circuits into which the various driving and control features may be incorporated to provide the above-mentioned control of the motors, clutches and leveling jack. One such typical circuit is illustrated in FIG. 27 with regard to the leveling jack 46 of FIGS. 1 and 14. The conventional linear actuator cylinder 48 contains a pair of windings 313 and 314. Current is directed to the appropriate of these two windings from a battery 316 through a manually operated switch 318 and through the aforementioned front-to-rear leveling switch 176. The output from the leveling switch is directed through internal limit switches 320 and 322 to the windings 313 and 314. The commercial units are provided with a capacitor 324 to prevent excessive surges upon opening and closing of the contacts.

The apparatus described hereinabove although developed principally for use with a wheel chair that may ascend or descend stairs safely as well as traverse across substantially level terrain, may be used for other objects. For example, in FIG. 28, a similar climbing mechanism is applied to a platform 326 carrying an object 328; for example, a robot. In this particular embodiment, a pair of forward wheels 330a, 330b (with respect to the direction ascending stairs) are stationary with regard to the level of the platform 326, and each is supplied with a climbing chain 332a and 332b, respectively. A rearward wheel 334 is vertically adjustable by means of a track or other mechanism 336 whereby wheel 334 may be adjusted such that the alignment of wheel 330 and wheel 334 matches the approximate pitch of stairs to be climbed or the terrain to be traversed. This rear wheel 334 is also provided with an appropriate climbing chain 338, whose function, together with that of climbing chain 332, is to bring about the ascending or descending of stairs by the platform 326 and its load 328. The same type of level sensing and motor control as described with regard to the motor driven wheel chair are to be incorporated into this embodiment whereby the platform 326 would be automatically aligned properly at the base of the stairs, at the top of the stairs and any intermediate positions whereby the device would properly follow the contour of the stairs. This same embodiment may be used for any type of load not only the robot, but any object where there is a desire to move from one level to another along a stairway. The automatic controls may be built within the device or, alternately, the device may be radio controlled with signals derived within the device and control signals sent from a distant control point.

From the foregoing description of preferred embodiments, it will be recognized that a mechanism has been provided which will safely transport a wheel chair or other object upwardly or downwardly on a staircase as well as provide for transport across a relatively flat terrain. Specifically with regard to a wheel chair, an embodiment has been provided which may be operated by the occupant of the wheel chair with automatic safety features which control certain aspects of the wheel chair thereby minimizing danger to the occupant. In addition, a power unit is provided for those persons who have extremely limited dexterity or strength and, as above, sufficient safety aspects are incorporated to automatically control the wheel chair in situations where the operator may have insufficient ability for control as at the initial approaching of a stairs from the bottom or top. Furthermore, the automatic braking of the mechanism through the use of the worm-worm gear combinations permit the stopping and holding of the wheel chair at any position for safety or other reasons.

It is, of course, understood that although perferred embodiments of the present invention have been illustrated and described, various modifications thereof will become apparent to those versed in the art. Accordingly, the scope of the invention should only be defined by the appended claims and the equivalents thereof.

I claim:

1. Apparatus for moving an object over substantially varying terrain, including stairs having stair treads, which comprises:
    a frame for supporting said object, said frame having opposite sides and a front portion and a rear portion;
    first wheel means mounted from said front portion of said frame having a front wheel proximate each side of said frame for engagement with said terrain;
    second wheel means mounted from said rear portion of said frame having a rear wheel proximate each side of said frame for engagement with said terrain;
    drive means connected to at least one of said first and said second wheel means for rotating corresponding of said wheels against said terrain;
    first level sensing means carried by said frame for continuously sensing any change in pitch of said frame from a pre-set pitch value;
    means responsive to said first level sensing means connected between said frame and at least one of said first and second wheel means for correcting said pitch to said pre-set pitch value;
    rotatable means carried by said frame for engaging said stair treads and for moving said frame ascending and descending said stairs, said rotatable means comprising a plurality of flexible endless members supported from said frame in a plane substantially perpendicular to said terrain, means for rotating said endless members, and stair tread engaging lugs attached to and extending outwardly from said endless members in said plane; and
    means for selectively varying the relative rotational speed of said flexible endless members to facilitate the positioning of said tread engaging lugs of said endless members in supportive contact with said stair treads.

2. The apparatus of claim 1 wherein said means for selectively varying the relative rotational speed of said flexible endless members comprises load sensing means for sensing whether said flexible endless members are in supportive contact with said stair treads, and a gear assembly associated with each said endless member for selectively altering the rotational speed of said endless member contingent upon whether said endless member is in supportive contact with said stair treads and contingent upon the direction of traversal of said stair.

3. The apparatus of claim 1 wherein said means for selectively varying the relative rotational speed of said flexible endless members facilitates the rotation of said endless members which are not in supportive contact with said stair relatively faster than said endless members which are in supportive contact with said stair and in the same rotational direction when said apparatus is ascending said stair, and facilitates the rotation of said endless members which are in supportive contact with said stair relatively faster than said endless members which are not in supportive contact with said stair when said apparatus is descending said stair.

4. The apparatus of claim 1 wherein each said flexible endless member is supported upon spaced apart sprockets, one said sprocket being mounted upon a shaft for rotation therewith, said shaft being provided with a first worm gear for rotating said shaft and said sprocket, and said means for rotating said endless members is provided with a selectively rotated drive shaft associated with each said endless member, and wherein said endless member is provided with means for selectively varying the relative rotational speed of said flexible endless members, said speed varying means comprising:

a speed shifting shaft rotatably and slidably journaled through a bearing so as to axially reciprocate, said bearing being housed within a suitable bearing housing, said speed shifting shaft comprising first and second end portions, said first end portion of said shaft being received in a spring retainer, said spring retainer housing a spring for rearwardly biasing said speed shifting shaft, said shifting shaft being provided with a gear engaging pin aligned substantially perpendicular to the axis of said shifting shaft, said pin comprising oppositely disposed first and second end portions extending outwardly from said shaft;

load sensing means comprising a load sensing worm gear mounted on said speed shifting shaft proximate said second end portion, said load sensing worm gear being positioned such that it meshes with said first worm gear for driving said sprocket, such that when said sprocket is loaded, said load sensing worm gear and said speed shifting shaft are axially moved in a forward direction, overcoming said spring bias; and a speed varying gear assembly comprising a first loaded spur gear and a first unloaded spur gear both provided with an axial hole therethrough for slidably receiving said speed shifting shaft, each of said first spur gears being provided with a pair of oppositely disposed chases for slidably receiving said first and second end portions of said gear engaging pin, said gear assembly further comprising a second loaded spur gear and a second unloaded spur gear, said second loaded spur gear being mounted on said drive shaft of said means for rotating said endless member such that said second loaded spur gear meshes with said first loaded spur gear, said second unloaded spur gear being mounted on said drive shaft such that said second unloaded spur gear meshes with said first unloaded spur gear, said second unloaded spur gear being provided with a roller clutch for selectively engaging said drive shaft contingent on the direction of rotation of said drive shaft such that said second unloaded spur gear selectively rotates with said drive shaft in only one preselected rotational direction.

5. The apparatus of claim 4 wherein said first loaded spur gear is rotated in a preselected direction relative to said second unloaded spur gear in all driven modes, and wherein each said first and second end portions of said gear engaging pin is provided with oppositely disposed substantially parallel engaging surfaces for slidably engaging said chases of said first spur gears and further provided with oppositely disposed substantially parallel camming surfaces angularly adapted to selectively cam said engaging pin to engage one or the other of said first spur gears.

6. The apparatus of claim 5 wherein said engaging surfaces of said pin and said camming surfaces of said pin intersect so as to define first and second obtuse corners, said corners being aligned on a common plane substantially perpendicular to the axis of said speed shifting shaft.

7. The apparatus of claim 5 wherein each said oppositely disposed chase of at least one of said first spur gears is provided with a beveled camming surface to facilitate the camming of said gear engaging pin into or out of said chase.

8. The apparatus of claim 1 wherein said means for selectively varying the relative rotational speed of said flexible members comprises:

first electrical circuitry means associated with each said flexible endless member for sensing whether said flexible endless member is in supportive contact with said stair treads; and second electrical circuitry means associated with each said flexible endless member, responsive to said first circuitry means, for selectively altering the rotational speed of said endless member contingent upon whether said endless member is in supportive contact with said stair treads and contingent upon the direction of traversal of said stair.

9. Apparatus for moving an object over substantially varying terrain, including stairs having stair treads, which comprises:

a frame for supporting said object, said frame having opposite sides and a front portion and a rear portion;

first wheel means mounted from said front portion of said frame having a front wheel proximate each side of said frame for engagement with said terrain;

second wheel means mounted from said rear portion of said frame having a rear wheel proximate each side of said frame for engagement with said terrain;

drive means connected to at least one of said first and said second wheel means for rotating corresponding of said wheels against said terrain;

first level sensing means carried by said frame for continuously sensing any change in pitch of said frame from a pre-set pitch value;

means responsive to said first level sensing means connected between said frame and at least one of said first and second wheel means for correcting said pitch to said pre-set pitch value;

a stair engaging means associated with each of said front wheels and said rear wheels for causing said apparatus to ascend or descend said stairs, said stair engaging means including an oval-shaped carrier unit having a peripheral flexible endless member mounted in a substantially vertical plane, means connected to said endless member for rotating said endless member about said carrier, and lugs extending from said endless member in said vertical plane for engagement with treads of said stairs; and means for selectively varying the relative rotational speed of said flexible endless members to facilitate the positioning of said lugs of said endless members in supportive contact with said stair treads.

10. The apparatus of claim 9 wherein said oval-shaped carrier is mounted in a substantially vertical plane with the long dimension of the oval oriented at an angle from horizontal and with one end of said oval carrier being proximate corresponding of said wheels, and wherein said lugs are deployable so as to be movable from a retracted position to a deployed position upon contact of a portion of said lugs with said treads.

11. The apparatus of claim 9 wherein said means for selectively varying the relative rotational speed of said flexible endless members comprises load sensing means for sensing whether said flexible endless members are in supportive contact with said stair treads, and a gear assembly associated with each said endless member for selectively altering the rotational speed of said endless member contingent upon whether said endless member is in supportive contact with said stair treads and contingent upon the direction of traversal of said stair.

12. The apparatus of claim 9 wherein said means for selectively varying the relative rotational speed of said flexible endless members facilitates the rotation of said endless members which are not in supportive contact with said stair and in the same rotational direction when said apparatus is ascending said stair, and facilitates the rotation of said endless members which are in supportive contact with said stair relatively faster than said endless members which are not in supportive contact with said stair when said apparatus is descending said stair.

13. The apparatus of claim 9 wherein each said carrier unit is provided with a shaft and a sprocket for rotating said flexible endless member, said sprocket being mounted upon said shaft, said shaft being provided with a first worm gear for rotating said shaft and said sprocket, and said means for rotating said endless members is provided with a selectively rotated drive shaft associated with each said endless member, and wherein said endless member is provided with means for selectively varying the relative rotational speed of said flexible endless members, said speed varying means comprising:

a speed shifting shaft rotatably and slidably journaled through a bearing so as to axially reciprocate, said bearing being housed within a suitable bearing housing, said speed shifting shaft comprising first and second end portions, said first end portion of said shaft being received in a spring retainer, said spring retainer housing a spring for rearwardly biasing said speed shifting shaft, said shifting shaft being provided with a gear engaging pin aligned substantially perpendicular to the axis of said shifting shaft, said pin comprising oppositely disposed first and second end portions extending outwardly from said shaft;

load sensing means comprising a load sensing worm gear mounted on said speed shifting shaft proximate said second end portion, said load sensing worm gear being positioned such that it meshes with said first worm gear for driving said sprocket, such that when said sprocket is loaded, said load sensing worm gear and said speed shifting shaft are axially moved in a forward direction, overcoming said spring bias; and a speed varying gear assembly comprising a first loaded spur gear and a first unloaded spur gear both provided with an axial hole therethrough for slidably receiving said speed shifting shaft, each of said first spur gears being provided with a pair of oppositely disposed chases for slidably receiving said first and second end portions of said gear engaging pin, said gear assembly further comprising a second loaded spur gear and a second unloaded spur gear, said second loaded spur gear being mounted on said drive shaft of said means for rotating said endless member such that said second loaded spur gear meshes with said first loaded spur gear, said second unloaded spur gear being mounted on said drive shaft such that said second unloaded spur gear meshes with said first unloaded spur gear, said second unloaded spur gear being provided with a roller clutch for selectively engaging said drive shaft contingent on the direction of rotation of said drive shaft such that said second unloaded spur gear selectively rotates with said drive shaft in only one preselected rotational direction.

14. The apparatus of claim 13 wherein each said first and second end portions of said gear engaging pin is provided with oppositely disposed substantially parallel engaging surfaces for slidably engaging said chases of said first spur gears and further provided with oppositely disposed substantially parallel camming surfaces angularly adapted to selectively cam said engaging pin to engage one or the other of said first spur gears.

15. The apparatus of claim 14 wherein said surfaces of said pin and said camming surfaces of said pin intersect so as to define first and second obtuse corners, said corners being aligned on a common plane substantially perpendicular to the axis of said speed shifting shaft.

16. The apparatus of claim 14 wherein said oppositely disposed chase of at least one of said first spur gears is provided with a beveled camming surface to facilitate the camming of said gear engaging pin into or out of said chase.

17. The apparatus of claim 9 wherein said means for selectively varying the relative rotational speed of said flexible members comprises:

first electrical circuitry means associated with each said flexible endless member for sensing whether said flexible endless member is in supportive contact with said stair treads; and second electrical circuitry means associated with each said flexible endless member, responsive to said first circuitry means, for selectively altering the rotational speed of said endless member contingent upon whether said endless member is in supportive contact with said stair treads and contingent upon the direction of traversal of said stair.

* * * * *